US010642738B1

(12) United States Patent
Parakh et al.

(10) Patent No.: US 10,642,738 B1
(45) Date of Patent: May 5, 2020

(54) DISTRIBUTED CACHING SYSTEM

(71) Applicant: Amazon Technologies, Inc., Reno, NV (US)

(72) Inventors: Vishal Parakh, Seattle, WA (US); Antoun Joubran Kanawati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 868 days.

(21) Appl. No.: 13/720,675

(22) Filed: Dec. 19, 2012

(51) Int. Cl.
G06F 12/08 (2016.01)
G06F 12/0813 (2016.01)

(52) U.S. Cl.
CPC ................................. *G06F 12/0813* (2013.01)

(58) Field of Classification Search
None
See application file for complete search history.

(56) References Cited

U.S. PATENT DOCUMENTS

| | | | |
|---|---|---|---|
| 6,449,695 | B1 | 9/2002 | Bereznyi et al. |
| 6,453,404 | B1 | 9/2002 | Bereznyi et al. |
| 6,496,917 | B1 | 12/2002 | Cherabuddi et al. |
| 6,704,843 | B1 | 3/2004 | Arimilli et al. |
| 6,877,077 | B2 | 4/2005 | McGee et al. |
| 7,240,100 | B1 | 7/2007 | Wein et al. |
| 7,653,668 | B1 * | 1/2010 | Shelat et al. ................. 707/610 |
| 7,870,380 | B2 | 1/2011 | Van Heyningen et al. |
| 8,161,244 | B2 * | 4/2012 | Krishnaprasad et al. .... 711/136 |
| 8,438,337 | B1 * | 5/2013 | Garg et al. .................... 711/121 |
| 8,683,129 | B2 | 3/2014 | Ona et al. |
| 9,064,124 | B1 | 6/2015 | Davis et al. |
| 9,166,862 | B1 | 10/2015 | Davis et al. |
| 2002/0099957 | A1 | 7/2002 | Kramer et al. |
| 2002/0138551 | A1 | 9/2002 | Erickson |
| 2003/0110350 | A1 | 6/2003 | McGee et al. |
| 2004/0044771 | A1 | 3/2004 | Allred et al. |
| 2005/0144186 | A1 | 6/2005 | Hesselink et al. |
| 2006/0155997 | A1 | 7/2006 | Fritzges et al. |
| 2007/0156876 | A1 | 7/2007 | Sundarrajan et al. |
| 2008/0040484 | A1 | 2/2008 | Yardley |
| 2008/0222281 | A1 | 9/2008 | Dilley et al. |
| 2010/0115613 | A1 | 5/2010 | Ramaswami et al. |
| 2010/0217815 | A1 | 8/2010 | Khan et al. |

(Continued)

OTHER PUBLICATIONS

Designing and Implementing Scalable Applications with Memcached and MySQL, A MySQL White Paper, Jun. 2008.
Dierks et al., The TLS Protocol Version 1.0, RFC 2246, Jan. 1999.
Rescorla, HTTP Over TLS, RFC 2818, May 2000.
Jungmaier et al., Transport Layer Security over Stream Control Transmission Protocol, RFC 3436, Dec. 2002.

(Continued)

*Primary Examiner* — Tracy C. Chan
(74) *Attorney, Agent, or Firm* — Knobbe, Martens, Olson & Bear, LLP

(57) ABSTRACT

Embodiments of a distributed caching system are disclosed that cache data across multiple computing devices on a network. In one embodiment, a first caching system serves as a caching front-end to a distributed cluster of additional caching systems. The caching systems may be spread over multiple partition groups. In one embodiment, cache writes at a cache system in one partition group are distributed to other partition groups. By propagating the cache writes across multiple partition groups, the caches at the different partition groups include more recently accessed data, thereby increasing the likelihood of cache hits.

22 Claims, 10 Drawing Sheets

(56) References Cited

U.S. PATENT DOCUMENTS

| | | | |
|---|---|---|---|
| 2010/0268789 A1* | 10/2010 | Yoo | H04L 67/2842 709/214 |
| 2011/0082908 A1 | 4/2011 | Ban | |
| 2011/0161723 A1 | 6/2011 | Taleck et al. | |
| 2011/0252192 A1 | 10/2011 | Busch et al. | |
| 2012/0036509 A1 | 2/2012 | Srinivasan et al. | |
| 2012/0054440 A1 | 3/2012 | Doig et al. | |
| 2012/0084384 A1* | 4/2012 | Erickson | 709/213 |
| 2012/0135726 A1 | 5/2012 | Luna et al. | |
| 2012/0180070 A1 | 7/2012 | Pafumi et al. | |
| 2012/0203866 A1 | 8/2012 | Yoo et al. | |
| 2012/0239871 A1 | 9/2012 | Badam et al. | |
| 2012/0290717 A1 | 11/2012 | Luna | |
| 2013/0046518 A1 | 2/2013 | Mejdrich et al. | |
| 2013/0179489 A1 | 7/2013 | Daley et al. | |
| 2013/0305086 A1* | 11/2013 | Yulizar | G11B 20/10527 714/6.3 |
| 2014/0115251 A1* | 4/2014 | Belluomini et al. | 711/113 |

OTHER PUBLICATIONS

Blake-Wilson et al., Transport Layer Security (TLS) Extension, RFC 3546, Jun. 2003.

Dierks et al., The Transport Layer Security (TLS) Protocol Version 1.1, RFC 4346, Apr. 2006.

Rescola et al., Datagram Transport Layer Security, RFC 4347, Apr. 2006.

Salowey et al., Transport Layer Security (TLS) Session Resumption without Server-Side State, RFC 5077, Jan. 2008.

Simon et al., The EAP-TLS Authentication Protocol, RFC 5216, Mar. 2008.

Dierks et al., The Transport Layer Security (TLS) Protocol Version 1.2, RFC 5246, Aug. 2008.

Badra, Pre-Shared Key Cipher Suites for TLS with SHA-256/384 and AES Galois Counter Mode, RFC 5487, Mar. 2009.

Eastlake, Transport Layer Security (TLS) Extensions: Extension Definitions, RFC 6066, Jan. 2011.

Mavrogiannopoulos et al, Using OpenPGP Keys for Transport Layer Security (TLS) Authentication, RFC 6091, Feb. 2011.

* cited by examiner

DISTRIBUTED CACHING SYSTEM

BACKGROUND

Caching is computer technology that allows computer processes to be accelerated. Generally, a computer uses multiple levels of memory types of varying sizes and speeds, with cheaper memory being generally slower and bigger in storage size and more expensive memory being generally faster and smaller in storage size. As faster memory is generally small in storage size, only a limited amount of data can be stored on the faster memory types in the computer. Generally described, caching attempts to anticipate what data items are needed by the computer in the future and attempts to keep those data items in the limited amounts of the faster memory types in order to improve performance by reducing access times to the data items. These data items can be maintained in a cache data structure in the computer memory.

Generally described, a cache (e.g., an application cache) includes a data structure that transparently stores data so that future requests for that data can be served faster. The data that is stored within a cache may include values that have been computed earlier or duplicates of original values that are stored elsewhere. If requested data is contained in the cache (e.g., cache hit), the request can be served by reading the cache instead of calculating the data or retrieving the data from elsewhere. If reading from the cache is faster than calculating or retrieving the data, then the request is served faster. Otherwise (e.g., cache miss), the data has to be recomputed or fetched from its original storage location, which can be comparatively slower. Generally, the greater the number of requests that can be served from the cache, the faster the overall system performance.

Generally, cache sizes are small relative to bulk computer storage. Nevertheless, caches have proven themselves useful in many areas of computing because access patterns in typical computer applications have locality of reference. For example, references exhibit temporal locality if data is requested again that has been recently requested already. In another example, references exhibit spatial locality if data is requested that is physically stored close to data that has been requested already. Thus, caches can be beneficial, despite being able to fit only a portion of data stored in the bulk computer storage.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
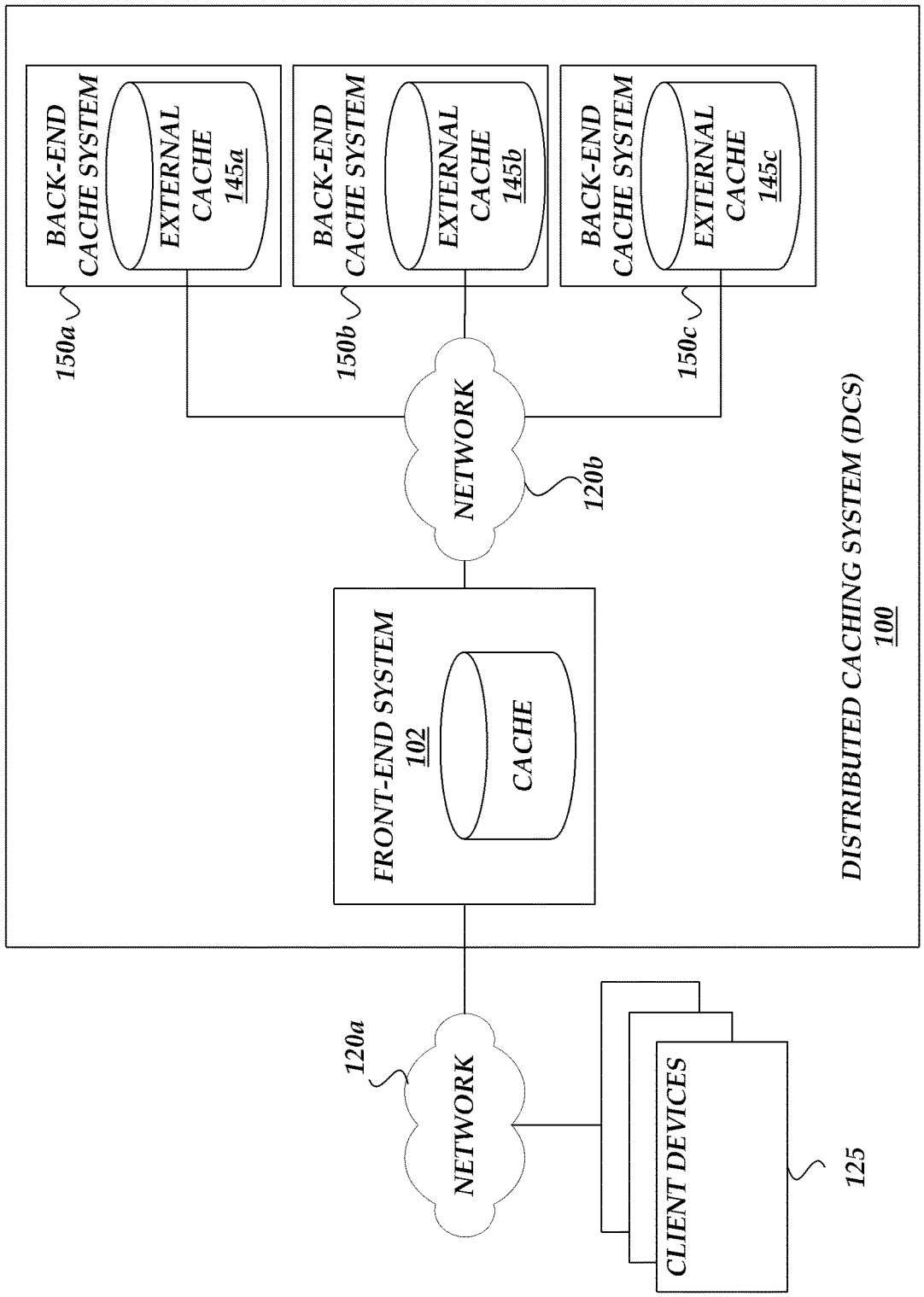
FIG. 1 is a block diagram schematically illustrating an embodiment of a distributed caching system for caching data across multiple computing devices.

Accessing slower memory types can cause computer processor unit (CPU) delay as the CPU waits for data items from the slower memory types to become available. This delay can be characterized as an expense that slows down the performance of a first computing system. One possible solution to this problem involves caching data items on faster memory types. However, as storage sizes of the faster memory types are limited, some searches for data items in the cache can result in a cache hit with the data item found and some searches can result in a cache miss, where the data item is not found. Thus, increasing the chances of the data item being found in the cache (sometimes referred to as the hit rate) can improve the performance of the computing system by reducing delays. For example, the hit rate can be increased by making available to the first computing system caches found on other computing systems on a network, thereby effectively increasing the storage size of the cache available to the first computing system and increasing the chance of a data item being found in the expanded, distributed cache.

Embodiments of a distributed caching system (DCS) are disclosed that cache data items across multiple computing devices on a network. In one embodiment, a first cache system (sometimes referred to herein as a caching system) of the DCS serves as a caching front-end or client interface to a distributed cluster of the other cache systems in the DCS, where the first cache system can receive and distribute cache requests to the additional cache systems, as needed. The first cache system can also serve as a cache server itself, by storing data items on its own internal cache. For example, the first cache system can first attempt to find a requested data item on the internal cache, but, if the lookup results in a cache miss, the first cache system can search the additional cache systems for the data item. In some embodiments, the first cache system is configured to multiplex requests to each additional cache system over a single Transmission Control Protocol (TCP) socket, which allows for network efficiencies and faster detection of failure. In some embodiments, the first cache system is configured to identify additional requests for the first data item and duplicate the requested data item in order to respond to the additional requests, which allows for greater responsiveness to requests.

In some embodiments, the distributed caching system is configured to store session state identifiers in a networked cache, while dynamically allocating requests to servers. Client devices can then resume secure sessions even if assigned to new servers as the new servers can obtain the session state identifiers from the distributed caching system. In at least some cases, the client device can be authenticated without the server having to perform a full authentication, thereby reducing the workload of the server and decreasing latency as the server can respond faster.

In some embodiments, the cache systems of the distributed caching systems are spread over multiple data centers. In one embodiment, cache writes at a cache system in one data center are distributed to other data centers. By propagating the cache writes across multiple data centers, the caches at the different data centers include more recently accessed data, thereby increasing the likelihood of cache hits.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of a Distributed Caching System

FIG. 1 is a block diagram schematically illustrating an embodiment of a distributed caching system 100 for caching data items across multiple computing devices (e.g., servers, other computers, etc.). The distributed caching system 100 can include one or more computing devices comprising processor(s), computer memory, network interface(s) and/or mass storage. The distributed caching system 100 can also include other computing systems, with each sub-system including one or more computing devices. Some or all of the computing devices or systems of the distributed caching system 100 can include a local cache. The distributed caching system 100 can include physical computing systems and/or virtual computing systems operating on physical computing systems. For example, the distributed caching system 100, in one embodiment, can be implemented as a group of virtual machine instances operating on computers in a data center.

Generally, caches include copies of data items that are kept temporarily in the cache but that are primarily stored, more persistently, elsewhere on a primary data storage device or devices. Caches are usually significantly smaller than these primary data storage devices and thus cannot fit all the data items from the primary data storage device. Caches are also usually operating on cache memory that is significantly faster than the primary data storage device. Therefore, caches typically attempt to include the most used data items from the primary data storage in order to improve the performance of a computing system.

In some embodiments, the distributed caching system 100 is logically positioned between various computing services and one or more client devices 125 connected via a network 120a. For example, the distributed caching system 100 may provide caching for a web server or other computing service that processes request from the client devices. The distributed caching system can receive data item requests from the client devices, for example, on a network interface (e.g., Ethernet or other network interface card (NIC), 802.11a/b/g/n receiver, etc.) and process those requests. In one example, the client devices 125 operate web browsers that request web page data items from the distributed caching system 100. In one embodiment, the distributed caching system requests and/or pre-processes web pages on behalf of the web browser users. The distributed caching system 100 may be part of a cloud computing service provider that hosts many distinct web sites of many different entities, and the distributed caching system caches data items for those distinct web sites.

The distributed caching system 100 can cache data items from a variety of primary data sources, where the data items are primarily stored. For example, data items can be primarily stored on one or more mass storage devices on the distributed caching system. Such mass storage devices can include mechanical drives (e.g., hard disk drives, optical disk, tape), solid state drives (SSDs) that use integrated circuit assemblies as memory to store data items persistently, or combinations of the above (e.g., hybrid drives). Cached data items can also be primarily stored on external systems. In some embodiments, the distributed caching system 100 is connected, via a network 120b, to one or more servers, databases, and/or other data repositories where the primary copies of the data items are stored. For example, in the case of a cache miss, the distributed caching system 100 can search for the data items on other computing devices on the network 120b.

In addition to caching, individual computers used by the distributed caching system 100 can also be used to provide other functions and services, such as running virtual machine instances, providing computing resources such as computing power and storage, running one or more web servers and/or providing other computing services. For example, the same computer may provide caching services as well as web server services.

In one embodiment, a front-end system 102 for the distributed caching system 100 accepts requests on behalf of the distributed caching system 100, attempting to fulfill the request and/or finding an external cache (e.g., located on a separate computing device) that contains the requested data items. The front-end system 102 can be connected via a first network 120a (e.g., the Internet) to one or more client devices 125. The front-end system 102 can also be connected, via a second network 120b (e.g., a data center or private network), to one or more external caches 145a-c operating on one or more back-end cache systems 150a-c.

Figure 5:
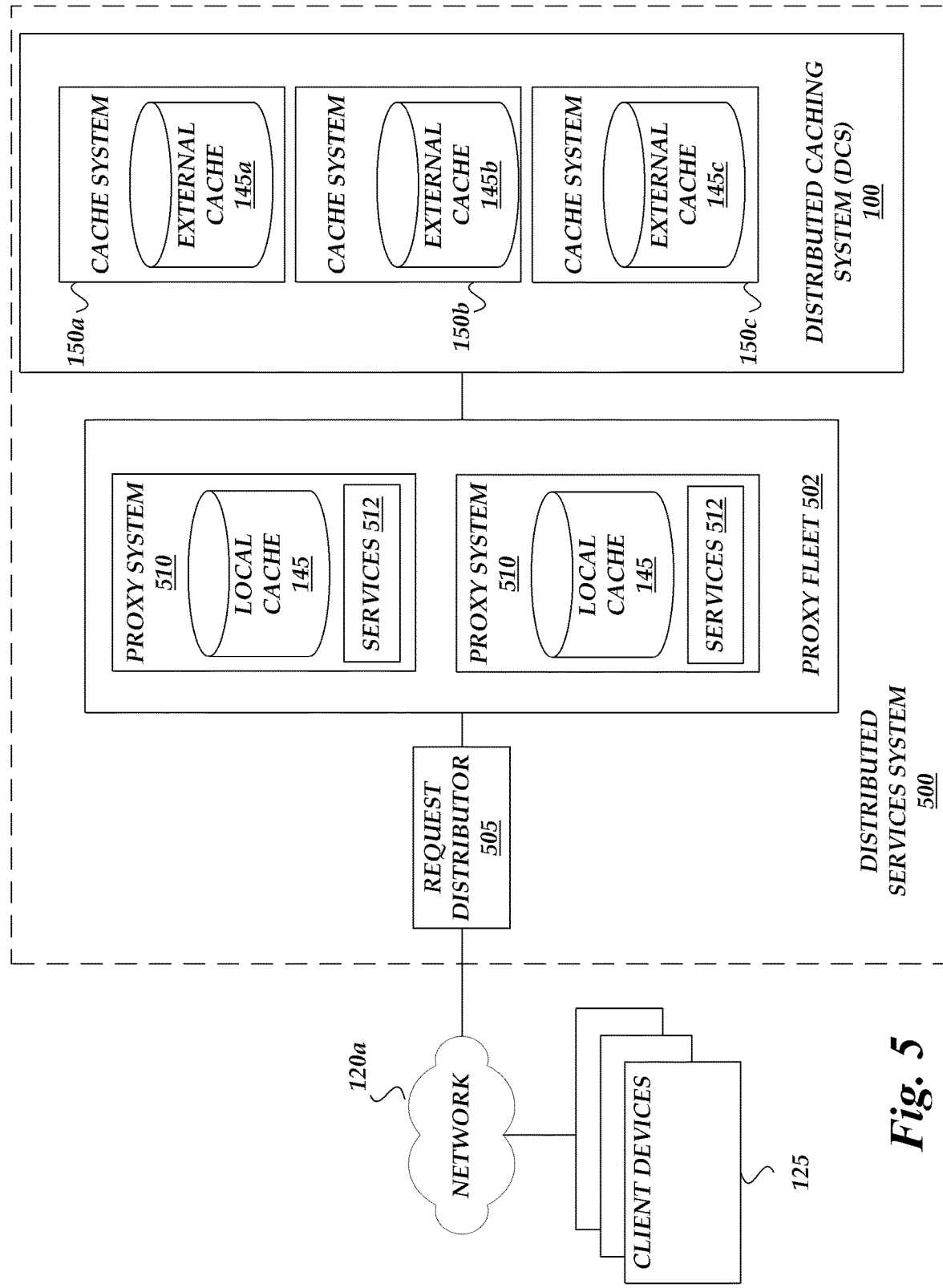
FIG. 5 illustrates a distributed services system that utilizes an embodiment of the distributed cache system of FIG. 1.

In some embodiments, multiple or each of the computing devices of the distributed caching system 100 can act as a front-end system 102. For example, a load-balancer or work distribution module may lie between the distributed caching system 100 and the client devices 125. The load-balancer may receive the requests from the client devices and assign them to a selected one of the computing devices of the distributed caching system 100 through a selection algorithm (e.g., round-robin, random, hashing, etc.). Once the selected computing device receives the request, it can attempt to fulfill the request using its internal cache, and, if the data items are not on the cache, the selected computing device can search on the network 120b for a computing device that contains the requested data items. FIG. 5 describes such embodiments in additional detail.

The distributed caching system 100 can support multiple levels of cache lookup. For example, the distributed caching system 100 can provide multiple levels of application caches to applications running on application servers. In one two-level embodiment, the first level involves the front-end system 102 performing a local lookup of the requested data items. If the lookup results in a cache miss, the front-end system can proceed to the second level by searching on the network at the additional external caches 145a-c for the data items. In some embodiments, the first cache system is configured to multiplex requests to each external cache system over a single TCP socket or other negotiated streaming protocol connection (e.g., Stream Control Transmission Protocol (SCTP), Unix domain sockets or other inter-process communication (IPC) socket, Synchronous Link Control (SLC), or the like), which allows for network efficiencies and faster detection of failure. In one embodiment, requests are multiplexed over a first connection protocol (e.g., Unix domain sockets or IPC sockets) for local communications in the front-end system 102 and a second connection protocol (e.g., TCP) for network communications.

As discussed above, the front-end system 102 can act as a cache server, responding to requests using data items from its own internal cache. The front-end system 102 may also act as a cache proxy, receiving and/or managing requests on behalf of the distributed caching system 100. In one embodiment, the front-end system 102 distributes requests among remaining systems in the distributed caching system 100.

In one embodiment, the front-end system 102 uses a hash function to consistently select a particular back-end cache system to handle a given data item. For example, the front-end system 102 can determine or generate a key from the request. It can then apply a hash function to the key to determine a particular back-end cache system to send the request to. By applying the hash function, the front-end system can consistently identify the particular back-end cache system whenever the same data items are requested. For example, if a client device 125 makes a first request for a first data item, the front-end system 102 can select a first back-end system to handle the request. If the client device (or another client device) makes a second request for the same first data item, the front-end system 102 can select the same first back-end system to handle the request. As the first back-end system handled the first request, the first-back-end will likely have the first data item in its cache and will not have to obtain the data item from primary storage, thereby speeding up the response time.

Consistent hashing is one example hashing algorithm that can be used by the distributed caching system 100 to map keys or data items to cache systems. In consistent hashing, the mapping of keys to slots (e.g., cache systems) remains largely static even if the number of slots changes (increased or decreases). For example, when the number of slots changes, on average, only K/n keys need to be remapped, where K is the number of keys and n is the number of slots. Consistent hashing is based on mapping each object to a point on the edge of a circle (or equivalently, mapping each object to a real angle). Each available machine (or other storage slot) is mapped to many pseudo-randomly distributed points on the edge of the same circle. To find where an object should be placed, a system using consistent hashing finds the location of that object's key on the edge of the circle; then walks around the circle until falling into the first slot it encounters (or equivalently, the first available slot with a higher angle). The result is that each slot contains all the resources located between its point and the next slot point. Consistent hashing is useful for the distributed caching system 100 as the number of cache systems can change based on failures and/or recoveries of the cache systems. Consistent hashing allows the distributed caching system 100 to account for those changes efficiently.

Referring back to the embodiment with a dynamically determined front-end system 102 described above, where the multiple systems of the distributed caching system 100 are capable of acting as a front-end, in one embodiment, each front-end candidate system uses the same hashing function to determine which back-end system is assigned to handle a request. For example, if a first front-end system receives a first request for the first data item, it selects a first back-end cache system. If a different front-end system receives a second request for the same first data item, it selects the same first back-end cache system. By consistently selecting back-end cache systems, the hit rate of the distributed caching system 100 will likely increase because the same back-end cache system is handling the same requested data item, regardless of from which front-end system on the distributed caching system 100 the request is received.

In some embodiments, TCP is used by the distributed caching system 100 to communicate between its components. TCP includes flow-control and congestion control properties that are desirable in a distributed caching architecture, given the large number of hosts that can be sharing a single instance (e.g., 2,000+). Flow control can be an important part of high-throughput request-reply systems and can enable graceful slowdown in the face of overload. Lack of proper end-to-end flow control is a common cause for complete failure in the face of high traffic. For example, in the absence of flow-control, a few misbehaving clients may have the ability to take down an entire fleet of cache systems or otherwise saturate the network 120b. While the distributed caching system 100 uses TCP in some embodiments, in other embodiments, the distributed caching system 100 can use other protocols, such as User Datagram Protocol (UDP), for its communications.

In one embodiment, the distributed caching system 100 implements a dead end-point detection mechanism based on the notion of inactivity. For example, a connection end-point may be considered inactive if no new traffic is received after a specified amount of time. This allows the distributed caching system 100 to shut-down inactive TCP end-points, thereby increasing the number of TCP end-points the distributed caching system 100 can handle before running into TCP connection limits. One benefit of such an embodiment is more robustness in the case of SYN (synchronize message) floods; such an embodiment can shut down connections, thereby making it more difficult for the SYN flood to saturate the network.

In one embodiment, the determination of inactivity of a TCP end-point is based at least partly on how the TCP connection is used. For example, if a TCP connection is being used to request or respond to a large data request, the time-out before endpoints of that TCP connection are considered inactive may be longer than if the TCP connection is being used for a small data request.

Various embodiments of the distributed caching system 100 may implement additional features. For example, the distributed caching system may allow randomization of retries of transactions. This can reduce contention or collisions in the network. In one embodiment, the distributed caching system 100 implements a stronger flow-control process between the client and the responding system. For example, clients read and then write. Servers write and then read. The TCP windows allow both the clients and servers to behave in a pipelined fashion, thereby increasing network efficiency.

In-Memory Caching

In one embodiment, each computing system (or some of the systems) in the distributed caching system 100 uses a caching structure to provide an in-memory cache to users of each computer. In one embodiment, the in-memory cache is configured to provide high memory efficiency. Typically, random access memory (RAM) is a limited resource on computing devices, particularly for computing devices that provide services to multiple users (e.g., multiple web server instances). A more memory efficient in-memory cache can result in fewer network calls compared to a less memory efficient cache. For example, higher memory efficiency can allow more data items to be stored on the in-memory cache, increasing the hit rate of the cache and thereby reducing the need to search external caches on the network for the data items. Typically, local memory access is significantly faster accessing memory over the network, thus, avoiding network calls tends to increased performance.

The caching structure can be maintained on the memory of the computing system. The memory can include processor cache (e.g., L1, L2, L3, etc.) and/or main memory (e.g., DDR RAM, SDRAM, other types of RAM, etc.). In some embodiments, the caching structure uses multiple levels of caches, with small fast caches backed up by larger slower caches. For example, the caching structure may operate by checking a smallest level 1 (L1) cache first; if it hits, the processor proceeds at high speed. If the smaller cache misses, the next larger cache (L2) is checked, and so on, before main memory is checked. In some embodiments, the caching structure uses only a single cache memory type.

While some embodiments use a slab allocation technique or a best fit allocation technique to assign storage space, in one embodiment, the caching structure utilizes small, fixed size storage blocks for storing data items. By using small, fixed size storage blocks, more data items can be stored on the same size of cache memory through higher efficiency. Generally, if a stored data item does not fill a storage block, the extra space is not used and is considered "wasted." For example, if a first cache uses 128 KB storage blocks and a second cache uses 1024 KB cache blocks, then if the caches store a 128 KB block, the first cache will have 0 (128 KB−128 KB=0) wasted space (100% efficiency), while the second cache will have 896 KB (1024 KB−128 KB=896 KB) of wasted space (12.5% efficiency). The efficiency advantage of using smaller storage blocks can also extend to larger stored data items. Generally, a data item can be subdivided into chunks equal to the block size, with any remainder data taking up a last storage block. If the last storage block is not filled, then space on the last block is wasted. Going back to the above example, if the caches stores a 600 KB data item, the first cache uses five storage blocks with 40 KB (5*128 KB−600 KB=40 KB) of wasted space (93.75% efficiency), while the second cache uses one storage block with 400 KB (1024 KB−600 KB=400 KB) of wasted space (58.6% efficiency).

However, using smaller blocks can increase access times for the cache. For example, referring to the above example for the 600 KB data item, five blocks need to be accessed from the first cache while only one block needs to be accessed on the second cache. Assuming the access times are roughly similar for different size blocks, the access time for the first cache for the 600 KB data item may be up to 5 times longer than the second cache. In some cases, accessing multiple blocks can be even more expensive if the blocks are stored in the memory cache in non-contiguous blocks. Nevertheless, the first cache may still be faster on average even if the access times are longer per operation if the cache hit rate of the first cache is sufficiently higher than the cache hit rate of the second cache. For example, assume the first cache has an access time of 5X and a hit rate of 90% while the second cache has an access time of X and a hit rate of 80% and the cost of a cache miss is 100X, where X is some arbitrary period of time. Then, for 100 requests, the first cache, on average, will take 14.5X to serve each request (5X*90%+100X*10%=14.5X). Meanwhile, the second cache, on average, will take 20.8X (X*80%+100X*20%=20.8X). Thus, depending on the circumstances, higher cache access times from using smaller block sizes can be more than offset by higher hit rates because of the generally significantly higher costs of accessing the slower, primary storage device where the data items are primarily stored.

The caching structure can implement various cache algorithms (also called replacement algorithms or replacement policies) to manage a cache of information stored on the computer. When the cache is full, the algorithm chooses which items to discard to make room for the new data items.

In some embodiments, the caching structure can use a cache algorithm to determine which data items to discard from the cache. Some example cache algorithms include: least recently used (LRU), most recently used (MRU), pseudo-LRU, random replacement, segmented LRU (SLRU), 2-way set associative, direct-mapped cache, adaptive replacement cache, clock with adaptive replacement and multi queue caching.

As will be recognized, the arrangement shown in FIG. 1 represents just one of many possible ways that the distributed caching system 100 may be arranged in a network. For example, the illustrated networks 120a, 120b may be different networks or part of the same network (e.g., the Internet). In one embodiment, the first network 120a is a public network while the second network 120b is a private network or vice versa. For ease of reference, the disclosure generally uses the term "network 120" to refer to either or both networks 120a, 120b.

The client computing devices 125 may include, for example, personal computers (PCs), personal digital assistants (PDAs), cellular telephones, laptops, tablets, e-book readers and other types of devices that support web browsing or otherwise access online computing services. For example, the client devices may be used by users to connect to various types of web sites, such as sites related to shopping, news, organizations, sports, games, product reviews or the like. These web sites may be hosted by various web servers.

As discussed above, data items can be primarily stored and cached from a variety of data repositories that can be local to components of the distributed caching system 100 or can be on networked or distributed systems. The data repositories may be implemented using any type or types of physical computer storage. For example, such data repositories can include magnetic hard drives, solid state drives or memory, optical disc and/or the like. Various data structures can be used to store the data items, such as electronic files, databases or other data structures.

Examples of Caching Systems

Figure 2A:
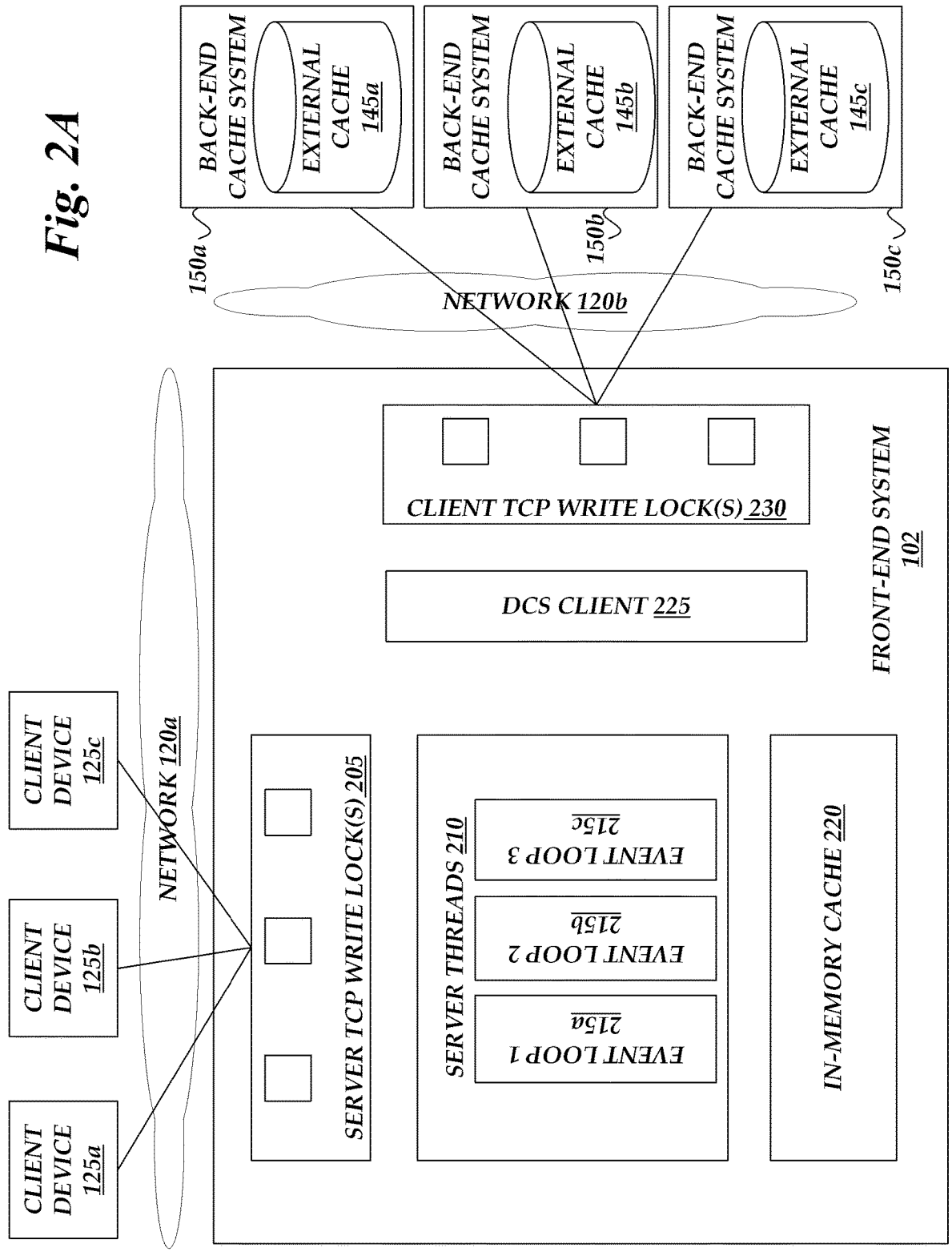
FIG. 2A schematically illustrates an embodiment of the front-end system of FIG. 1.

FIG. 2A schematically illustrates an embodiment of the front-end system 102 of FIG. 1. In the illustrated embodiment, the front-end system is in communication with multiple client devices 125a-c and multiple external caches 145a-c operating on multiple back-end cache systems 150a-c.

In one embodiment, the front end system 102 includes a server TCP write lock 205 for managing access to connections between client devices and server threads 210 on the front-end system. In one embodiment, a lock (also called a mutex) is a synchronization mechanism for enforcing limits on access to a resource in an environment where there are many threads of execution. A lock can be used to enforce a mutual exclusion concurrency control policy. In one embodiment, reading ends of a server TCP end point are acted on by only a single event loop while writing end points may be acted on by multiple loops or threads.

In some embodiments, the server threads 210 receive cached data from the distributed caching system 100 and communicate the requested cached data to the client devices 125*a-c*. The front end system 102 may be running multiple event loops 215*a-c* or threads to provide these caching services. In addition, in some embodiments, the front end system 102 can provide various services to users in addition to caching services. For example, such services can include storage of data, performing computations, serving web pages or the like. Some of the server threads 210 may be used to provide these services. The services may be different services or instances of the same service.

In some embodiment, the event loops 215*a-c* are I/O event driven loops. In one embodiment, the front-end system 102 stripes established connections over a small set of threads, each thread running its own private event loop. For example, the system 102 can associate a set of multiple threads to multiple network connections. When a request arrives on one of the network connections, the request can be assigned to one of the associated multiple threads. This design reduces the number of wakeups needed to process a single request, though it may increase the number of wake-ups that the operating system kernel needs to perform for a small number of concurrent requests. When processing a large number of concurrent requests however, the number of wakeups would be lower with the above configuration. Another advantage of the above configuration is that the state machine that represents a single client is not required to be thread-safe. Buffers also do not migrate between threads, which depending on the memory allocator in use, can result in significant reductions in heap growth and allocation time.

In one embodiment, the front-end system uses a custom event dispatch loop. In one embodiment, each event dispatch loop is bound to a thread and sockets hashed to one of many loops. Well behaving handlers have the ability to yield the event loop to prevent starvation of requests from other sockets. In some embodiments, the custom event dispatch loop is configured to handle socket events, signals and/or timers.

In some embodiments, the services are performed by server threads 210 or other server process (e.g., an application or virtual machine instance). In one embodiment, in order to minimize memory contention, server event handlers are only invoked via a single thread. Additionally, run-time statistics can be maintained using thread-local counters. In one embodiment, the server and client interaction are designed to maximize or increase flow control effectiveness using the techniques described above. The server process can include command parsers configured to minimize or reduce buffer allocation and copies. For each client, the server process can dedicate a small user-space queue that helps mitigate socket contention on the writing end. If the queue is full then the event handler for the socket can yield, so that other clients may be serviced. A yielded event handler can be restarted after all other events have been processed.

As discussed above, the front-end system 102 can include an internal in-memory cache 220 for storing data items on the front-end system. When server threads 210 need access to data items to fulfill a request, they can check the cache 220 to see if the data items have already been stored there. In the case of a cache miss, the system 102 can check the back-end cache systems of the distributed caching system 100 for the data items. As even networked caches are generally faster than accessing a primary storage device (e.g., a hard drive or database), the system 102 can improve performance by attempting to use resources from the external caches 145*a-c*, if available.

In one embodiment, the front-end system 102 includes a DCS client 225 that handles requests that resulted in a cache miss in the internal cache 220. The DCS client 225 can identify a backend cache system on which the requested data items may be stored. In one embodiment, the DCS client 225 generates or determines a key based on the requested data item and uses a hash function to identify a candidate backend system that may contain the requested data item. In one embodiment, the DCS client includes or has access to a list of backend cache systems on the distributed caching system 100, including the network location (e.g., IP addresses) of the backend cache systems.

In some cases, the candidate backend system may not store the data item because of data time outs, if the data item has not been requested before, if the data item was displaced from the cache by newer data items, etc. In those cases, the network cache request results in another cache miss and the front-end system 102 can obtain the requested data item from a primary storage device. However, if the candidate backend system does include the data item, then the candidate backend system can return the data item from its internal cache (e.g., a cache hit) to the front-end system.

The DCS client 225 may take advantage of the separation between the reading and writing halves of a TCP socket when it dispatches and/or receives response from the back-end cache systems. As discussed above, in one embodiment, any requests that cannot be fulfilled by the local cache 220 are delegated to the locally running DCS client 225. The front-end system 102 can continue to serve requests that have arrived after the delegated request. Once a reply arrives, the DCS client can directly write the reply to the writing half of the originating client's TCP socket, as well as save the reply it to the local cache 220. In one embodiment, if the originating client disconnects, the system 102 still saves the result to the local cache 220 so that it can be available for future transactions, such as if the originating client reconnects.

In one embodiment, the DCS client 225 uses a single TCP socket per end-point. For example, the distributed caching system 100 can multiplex multiple requests to a back-end cache system over the single TCP socket. For example, when the client 225 is processing a first request, it can determine if other requests are pending for the same back-end cache system and aggregate that request over the single TCP socket. By doing so, the DCS client 225 can reduce the number of active connections any single front-end or back-end cache system would need to handle. As concurrent requests to the same end-point can be aggregated, this can also reduce the number of outbound network packets, reducing load on the network. In addition, using a single TCP socket can result in faster TCP ramp-up and potentially offers better network utilization by allowing more aggressively pipelined requests on the fly. In cases where the system 102 provides virtual machine instances, having a single TCP socket per end-point frees users of the virtual machine instances from having to manually tune the size of the connection pool.

The DCS client 225 can use a callback model to notify callers of completion of requests. In some cases, aggregated requests over a single connection may be received and processed in a different order than when sent. Requests can be written directly to the socket by the DCS client if the socket is writable and an event loop 215*a-c* is not concurrently writing. This can save the delay incurred from waking an event loop to write the request to the TCP socket connected to the requesting client device.

The front end system 102 can also include a client TCP write lock 230 for controlling access to TCP connections between the backend cache systems 150a-c and the front-end system 102. In one embodiment, the front end system 102 shuts down TCP connections (e.g., to client devices or backend systems) that are deemed inactive, in order to control the amount of active TCP connections existing concurrently. Many operating systems have limits for the number of active TCP connections, and by managing the connections, the front-end system 102 can enhance its responsiveness to requests (e.g., by not having to wait for TCP connections to become available if the limit is reached).

Figure 2B:
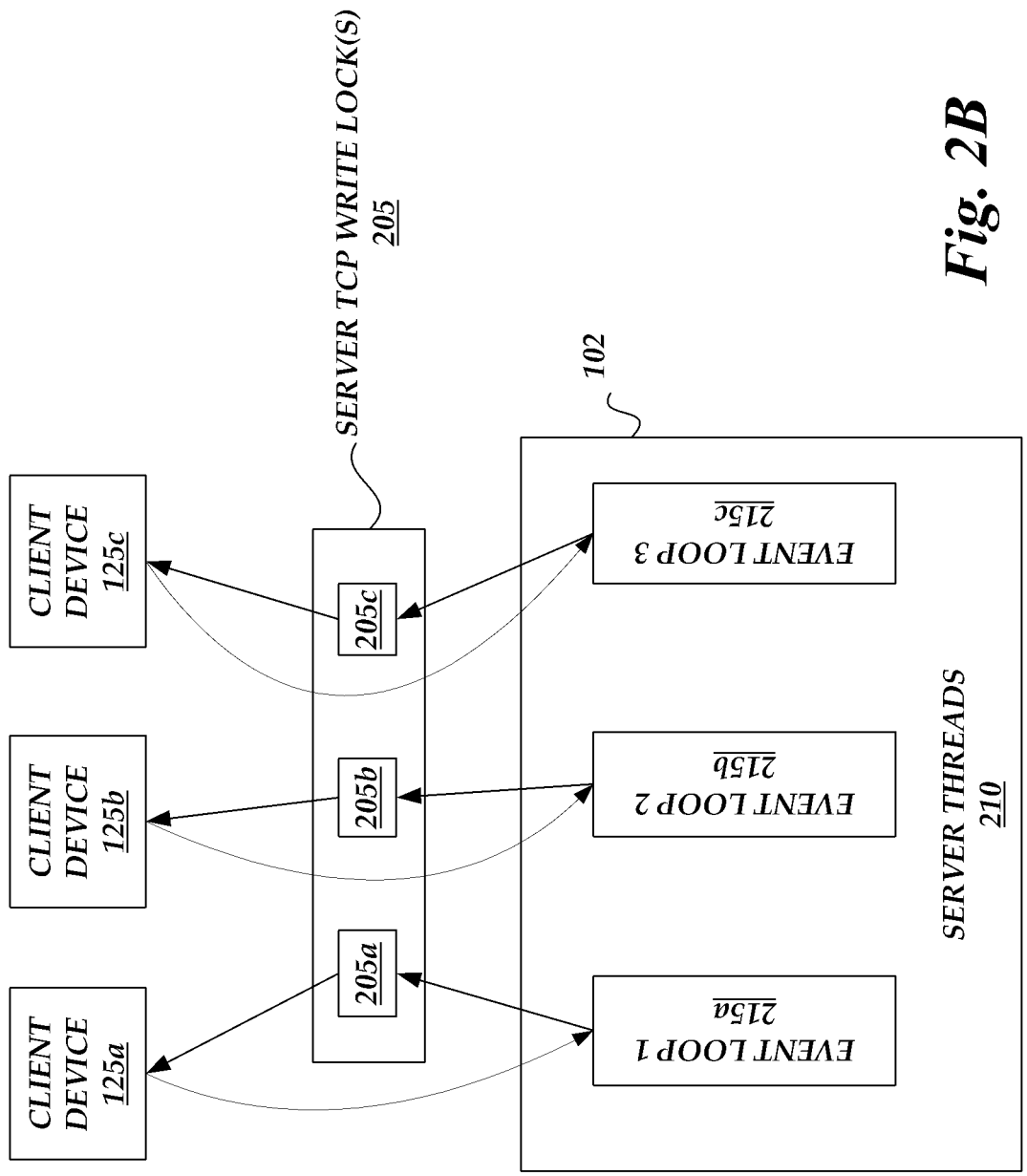
FIG. 2B schematically illustrates an example data flow between an embodiment of the front-end system of FIG. 2B and the client devices during write operations.

FIG. 2B schematically illustrates an example data flow between an embodiment of the front-end system 102 of FIG. 2B and the client devices 125a-c during write operations. In the illustrated figure, client devices and the respective TCP connections associated with the client devices are associated with a particular server TCP write lock. For example, in FIG. 2B, lock 205a is associated with client device 125a, lock 205b with client device 125b and lock 205c with client device 125c. In one embodiment, in order for an event loop to communicate with the particular client device by writing on the TCP connection, the event loop first acquires the write lock associated with the particular client device. In some embodiments, while writing to the connections from the server side requires the use of a server write lock 205, client devices can freely write to the connections without using locks.

As discussed above, in some embodiments, in order to improve throughput, a set of event loops are assigned or striped to a particular client device 125a. When a data item is received from the distributed caching system 100 that needs to be sent to the client device 125a, one of the event loops can be dynamically assigned to process the data item. For example, if other event loops are busy servicing other clients, the least busy event loop 215a may be selected. The even loop 215a can then acquire the server lock 205a associated with the client device 125a so that another event loop does not attempt to send the same data item to the client device 125a. The use of the server write locks can ensure that effort between the event loops are not duplicated. In some embodiments, the client TCP write locks 230 of FIG. 2A also serve a similar purpose for connections with the back-end cache systems 145a-c.

Examples of Caching Processes

Figure 3A:
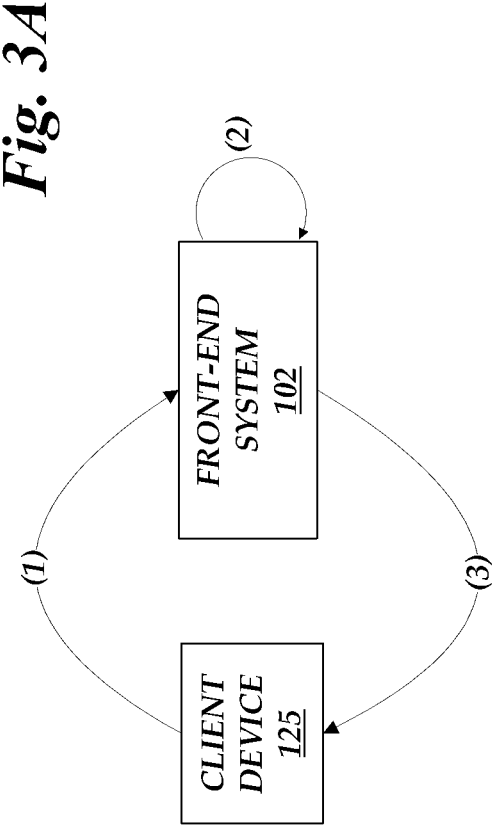
FIGS. 3A and 3B schematically illustrates embodiments of the data flow between various components of the distributed caching system of FIG. 1.
Figure 3B:
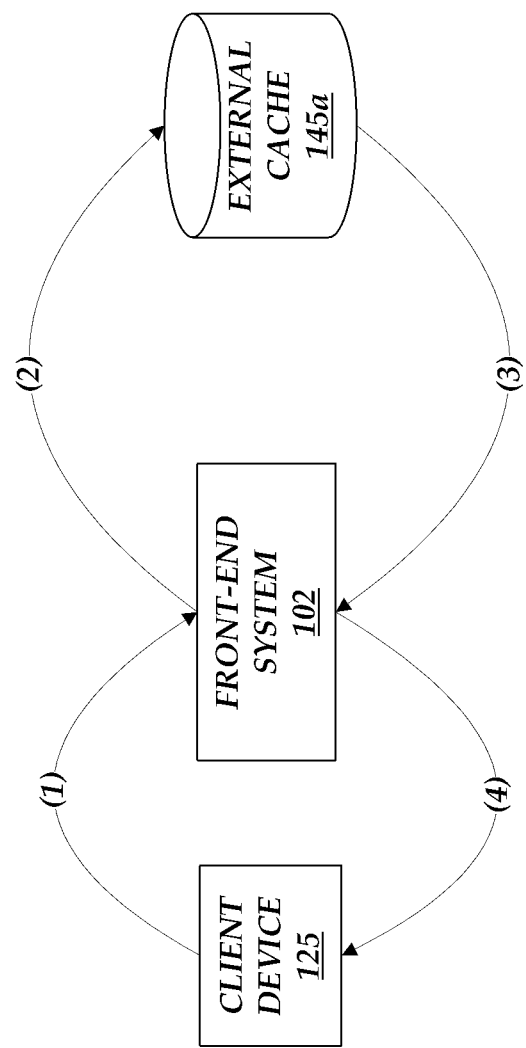

FIGS. 3A and 3B schematically illustrates embodiments of the data flow between various components of the distributed caching system 100. FIG. 3A illustrates an in-memory cache hit event. At event 1, the client device 125 sends a request to the front-end system 102. At event 2, the front-end system 102 searches and finds the requested data item in its internal cache. At event 3, the front-end system provides the requested data item to the client device 125.

FIG. 3B illustrates an in-memory cache hit miss event that results in a cache hit on a networked cache. At event 1, the client device 125 sends a request to the front-end system 102. At event 2, the front-end system 102 searches and fails to find the requested data item in its internal cache. It then identifies an external cache 145a designated to handle that request and sends the external cache 145a the data item request. At event 3, the external cache 145a searches and finds the requested data item in its internal cache. It then sends the requested data item to the front-end system 102. At event 4, the front-end system 102 saves the data item to its own cache and sends the requested data item to the client device 125.

Figure 4:
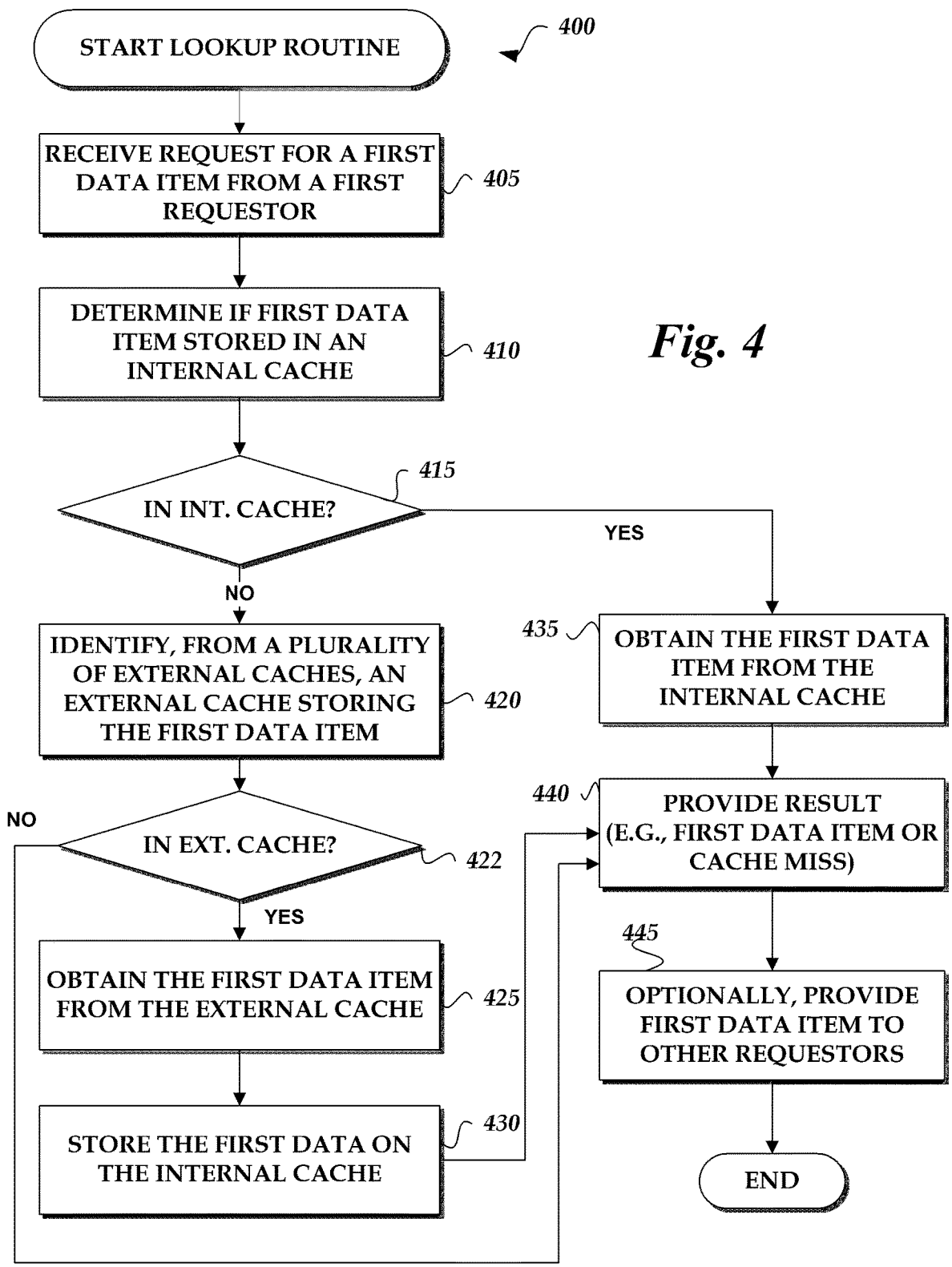
FIG. 4 schematically illustrates a logical flow diagram for a process to lookup data in the distributed caching system of FIG. 1.

FIG. 4 schematically illustrates a logical flow diagram for a lookup routine 400 to lookup data items in the distributed caching system 100 of FIG. 1. In some implementations, the routine is performed by embodiments of the distributed caching system 100 described with reference to FIG. 1 or by another component of the system 100, such as the front-end system 102. For ease of explanation, the following describes the routine as performed by the front-end system. The routine is discussed in the context of an example scenario that is intended to illustrate, but not to limit, various aspects of the distributed caching system 100.

Beginning at block 405, the front-end system 102 receives a first request for a first data item. For example, the first request may come from a client device 125 or a server thread 210 handling a request from the first client device, with the request received on an inter-process communication interface (e.g., a syscall, API, etc.). In some cases, the request is received on a networking interface of the front-end system 102 as part of network packets sent over the network 120a by the client device 125. A thread can then process the request and provide the request to the inter-process communication interface. One example transaction is a web page or web content request, where a browser on the client device 125 is requesting a web page and the distributed caching system 100 provides caching for a web server. The web server or a thread associated with the web server, after receiving the request, can request that the front-end system 102 provide the first data item. Other types of transactions may also be handled by the distributed caching system 100. As discussed above, caching data items can speed up a wide variety of data transactions.

At block 410, the front-end system 102 determines whether the first data item is stored in local in-memory cache 220 (sometimes referred to herein as an internal cache or a local cache). In one embodiment, the front-end system identifies a first key corresponding to the first data item. For example, the distributed caching system 100 can obtain or derive some type of identifier (e.g., session ID, user ID, URL, filename, etc.) from the first request. The front-end system 102 can then determine whether the key and a value associated with the key are in the cache. For example, the cache can include a hash table or similar structure and the system 102 checks if the hash table includes an entry for the key by applying a hashing function to the key.

At block 415, based on the determination, the front-end system 102 proceeds to block 420 or block 435. In some cases, the first data item is in the local in-memory cache (e.g., a cache hit) and the system proceeds to block 435. In some cases, the first data item is not in the local in-memory cache (e.g., a cache miss) and the system proceeds to block 420.

At block 420, the front-end system 102 identifies, from a plurality of external caches, an external cache designated to store the first data item. In one embodiment, the system 102 applies a hashing function (e.g., consistent hashing) or other deterministic function to the data item request or an identifier derived or generated from the data item request to identify the external cache. In one embodiment, the same data item request maps to the same external cache, thus, if the first data item has previously been requested, the external cache may still have the first data item cached.

At block 422, the front-end system 102 determines whether the external cache is storing the first data item. In some cases, the first data item may not be on the external cache. For example, the first data item may not have been requested before, thus the first data item has not yet been loaded onto the external cache from permanent storage. If the data item is not on the external cache, the routine 400 proceeds to block 440. If the data item is on the external cache, the routing proceeds to block 425.

At block 425, the front-end system obtains the first data item from the external cache, assuming the external cache has the data item. In some embodiments, if the external cache does not have the first data item stored, the backup cache system on which the external cache resides or the front-end system 102 can obtain the first data item from a primary data storage. In some cases, the primary data storage may be a mass storage device on the same computing system or computer as the front-end system 102. In some cases, the primary data storage may be a storage device located on the network 120b. For example, the primary data storage may be part of an external database or server. In other embodiments, the front-end system provides a notice of a cache miss rather than obtaining the first data item from the primary data storage.

At block 430, the front-end system 102 stores the first data item in its in-memory cache. In some cases, the cache may be full and the front-end system 102 identifies storage blocks in the cache that can be replaced with the first data item. For example, the system 102 may identify the least recently used blocks and then select those blocks for replacement. However, as discussed above, many different cache algorithms can be used to identify which storage blocks on the cache to replace. The routine 400 can then proceed back to block 430 and perform the functions described above for block 430.

At block 440, the front-end system 102 provides the results (e.g., first data item or a cache miss result). For example, the front-end system 102 can provide the first data item to the source of the request (e.g., a client device, a web server, a requesting thread, another service on same computer or the like) if the first data item was found on the internal cache or the external cache. If the first data item was not found, either on the internal cache or the external cache, the front-end system can inform the requestor (e.g., a requesting thread) that the cache request resulted in a cache miss. The requesting thread can then try to obtain the data from the primary data storage.

At block 445, the front-end system 102 optionally provides the first data item to other requestors. In many situations, there can be multiple requestors waiting for the same data item. For example, if the first data item is a news article hosted on a web site, many users of the web site may have requested the news article, particularly if the article is popular. In such situations, the front-end system can, in response to receiving the first data item, determine if other requestors are waiting for the first data item. For example, the front-end system can obtain or generate a key (e.g., using a hash function) associated with the first request. The system 102 can then determine if additional outstanding requests are associated with the same key, for example, by generating keys for those requests and checking if those keys match the key for the first request. The front-end system can then provide the first data item to all or some of the outstanding requests. By checking if the first data item is responsive to other requests, the front-end system 102 can reduce the latency of responses to those other requests because the other requestors can piggyback off the response to the first requestor. The routine 400 can then end.

For illustrative purposes, an example scenario describes one embodiment of a response duplication process in additional detail. In the scenario, the front-end system 102 obtains a first data item from a first cache (e.g., internal or external cache), the first data item responsive to a first request from a first requestor (e.g., a client device or a thread). Meanwhile, a second request for the first data item is received from a second requestor (e.g., a client device or a thread) before the first data item is retrieved. When the first data item is received, the front-end system can determine that the second request is pending and can subsequently send the first data item to the first requestor and the second requestor.

In some embodiments, the front-end system, in response to receiving the second request, sends out a second cache request for the first data item if the first cache request responsive to the first request is still outstanding. That is, there may be two (or more if additional requests are received) outstanding cache requests. In such cases, the front-end system can process whichever cache response (for the first cache request or second cache request) is received back first and provide the first data item to the first and second requestors. When the trailing cache response arrives, the front-end system can discard that cache response since the first data item has already been provided.

Referring back to block 415, if the in-memory cache includes the first data item, the routine 400 proceeds to block 435. At block 435, the front-end system 102 obtains the first data item from the cache. The routine 400 can then proceed to block 440 and block 445, perform the operations described above, and then end.

Session State Caching

FIG. 5 illustrates a distributed services system 100 that uses an embodiment of the distributed cache system 100 of FIG. 1 to speed up transport layer security (TLS) transactions or other types of authentication transactions by caching session state identifiers. In one embodiment, the distributed services system 500 includes one or more request distributor systems or modules 505, a proxy fleet 502 having one or more proxy systems 510 and a distributed caching system 100 having one or more cache systems 150a-c. The various components (e.g., the request distributor module, proxy servers, cache systems, etc.) can include physical or virtual computing systems having or associated with processor(s), computer memory, network interface(s) and/or mass storage devices. In some embodiments, the distributed services system 500 operate on one or more data centers in one or more geographic regions in or more different time zones. For example, the distributed services system 500 may be operated by a computing services provider that provides computing resources to customers, such as on an as-needed or on-demand basis.

In the illustrated embodiment, the request distributor 505 is configured to load balance or otherwise distribute workload to the proxy fleet 502. In one embodiment, load balancing is a computer networking methodology to distribute workload across multiple computers or a computer cluster, network links, central processing units, disk drives, or other resources, to achieve efficient resource utilization, increase throughput, reduce response time and avoid overload. In addition, using multiple components with load balancing, instead of a single component, may increase reliability through redundancy. The request distributor 505 can include dedicated software or hardware, such as a computing system, multilayer switch or a Domain Name System server.

In one embodiment, the proxy systems 510 are similar to or include at least some of the functionality of the front-end systems of FIG. 1. In the illustrated embodiment, the cache systems include a local cache 145 and a services module 512 for providing user services, such as processing Secure Sockets Layer (SSL) or TSL connection requests. For example, the proxy system 510 may include an application or virtual machine instance configured to provide some service, such as storage, computation and/or web hosting. As discussed above, the proxy fleet 502 can include physical computing systems and/or virtual computing systems operating on physical computing systems. For example, the proxy fleet 502, in one embodiment, can be implemented as a group of virtual machine instances operating on computers in a data center.

Transport Layer Security (TLS) is a cryptographic protocol that provides secure communications over the Internet. TLS encrypts the segments of network connections at the Application Layer for the Transport Layer, using asymmetric cryptography for key exchange, symmetric encryption for confidentiality, and message authentication codes for message integrity.

TLS is the successor to SSL, another cryptographic protocol. Several versions of the TLS protocols are in use in applications such as web browsing, electronic mail, Internet faxing, instant messaging and/or voice-over-IP (VoIP). Transport Layer Security, formerly SSL, is an Internet Engineering Task Force (IETF) standards protocol, first introduced as IETF Request for Comments (RFC) 2246 in January, 1999. Since that time, there have been numerous informational and standards track RFC's introducing new versions, options and extensions, including, but not limited to, RFC 2818, 3436, 3546, 4346, 4347, 5077, 5216, 5246, 5487, 6066, 6091. A specific embodiment herein is related to TLS session re-use, as introduced in RFC 5077.

The following describes the operation of an embodiment of the TLS protocol in which a client is authenticated via TLS using certificates exchanged between both server and the client during a handshake process. In TLS, a server proves its identity to the client. The client may also need to prove its identity to the server. Public-key infrastructure (PKI), the use of public/private key pairs, is the basis of this authentication. The exact method used for authentication is determined by the cipher suite negotiated.

In one embodiment of TLS, the client and server exchange random numbers and a special number called the Pre-Master Secret. These numbers are combined with additional data permitting client and server to create their shared secret, called the Master Secret. The Master Secret is used by client and server to generate the write MAC secret, which is the session key used for hashing, and the write key, which is the session key used for encryption. The client and server can then exchange application data over the secured channel they have established. All messages sent from client to server and from server to client are encrypted using session key.

Authentication can be computationally complex. For example, authentication can include public key operations (e. g., RSA) that are relatively expensive in terms of computational power. The TLS protocol provides a secure shortcut in the handshake mechanism to avoid at least some operations. In an ordinary full handshake, a session ID (or other session state identifier) is generated for the session and stored by the server. In one embodiment, the client associates this session ID with the server's IP address and TCP port, so that when the client connects again to that server, it can use the session ID to enable a shorter handshake process. In the server, the session ID maps to the cryptographic parameters previously negotiated and/or other session data from the previous session, such as the "master secret". In one embodiment, both sides must have the same "master secret," otherwise the resumed handshake will fail (beneficially, this can prevent an eavesdropper from using a session ID). This type of resumed handshake is sometimes called an abbreviated handshake or a restart handshake.

Referring back to the distributed caching system 100, in one embodiment, the distributed caching system 100 acts as a shared caching system for the proxy fleet 502, enabling TLS sessions or other secured sessions to be resumed or session data to be otherwise reused. By utilized a shared caching system, client devices can be transparently transferred to other proxy systems, allowing different proxy systems to serve client requests, even if a particular client device authenticated with a first proxy system but then is subsequently assigned to a second, different proxy system (e.g., during a second session). By allowing different proxy systems to handle subsequent requests from a particular client device, the distributed services system 500 can better manage resources, for example, by allowing subsequent requests to be assigned to less busy proxy systems 510.

For example, after the user is authenticated with the first proxy system, the first proxy system can save the session ID into a shared cache system 150a-c of the distributed caching system 100 so that, when the second proxy system handles another transaction from the client it can obtain the session ID from a shared cache in the distributed caching system 100. Generally, TLS authentication is computationally complex, such that reading the session ID from a cache instead of re-authenticating can improve system performance and reduce latency.

Figure 6:
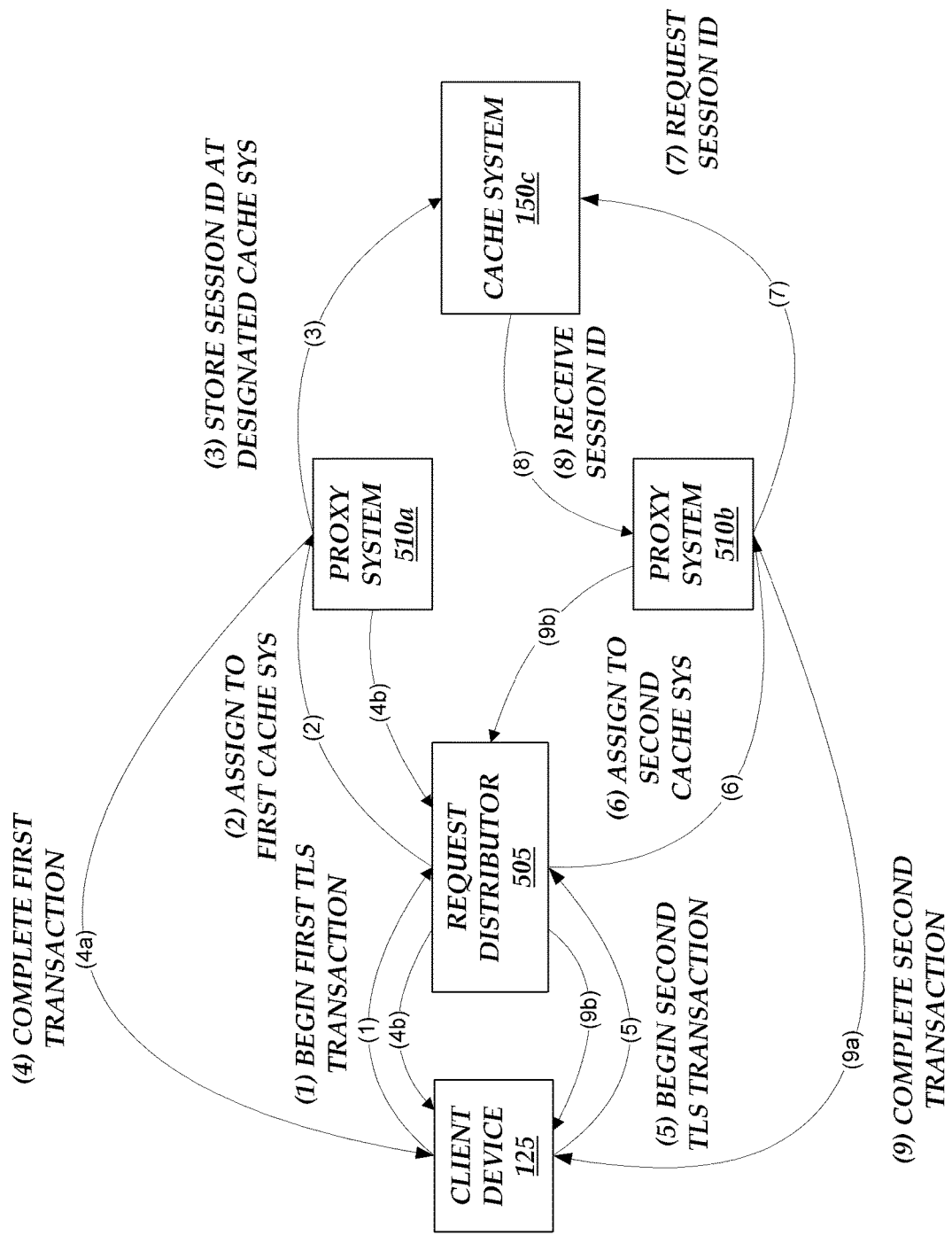
FIG. 6 illustrates an embodiment of the data flow in the distributed services system of FIG. 5 during a TLS authentication.

FIG. 6 illustrates an embodiment of the data flow in the distributed caching system 500 of FIG. 5 during an example embodiment of a TLS authentication transaction.

Starting at event 1, the client device 125 begins a first TLS transaction and sends a request to the request distributor 505. At event 2, the request distributor 505 determines which proxy system to assign the request to for processing. For this example, the request distributor assigns the request to a first proxy system 510a. As the client device 125 is not resuming an existing TLS session in this example, it goes through TLS authentication with the first proxy system 510a. During the authentication, a session ID is generated. At event 3, the first proxy system 510a identifies a designated cache system from the distributed caching system 100 for storing the session ID. As discussed above in FIG. 1, the designated cache system can be selected based on a hashing function (e.g., consistent hashing). For purposes of this example, the designated cache system is cache system 150c. However, in some cases, the designated cache system could be any cache system of the distributed cache system 100. At event 4, after the authentication is completed, the first proxy system 510a can provide the requested service and complete the first transaction. In some embodiments (4a), the first proxy system 510a responds directly to the client device 125, while in some embodiments (4b), the first proxy system 510a provides a response to the request to the request distributor 505, which then provides the response to the client device 125.

At event 5, the client device 125 begins a new, second transaction. Some time may have passed since the first transaction, and the request distributor 505, at event 6, reassigns the second transaction to the second cache system 510b. The second cache system 510b can attempt to speed up the authentication process by checking whether a session ID is stored for the client device 125, indicating the device 125 was recently authenticated. At event 7, the second proxy system 510b determines if the session ID is cached in the distributed caching system 500. In one embodiment, the second proxy system 510b checks its local cache for the session ID, and, if not found there, it identifies the designated cache 150c and requests the session ID from the external, designated cache system 150c. In one embodiment, the second proxy system 510b checks the local and external caches by performing a routine that is similar to the routine 400 described in FIG. 4. At event 8, the second proxy system 510b receives the session ID from the cache system 150c, assuming the session ID is still stored by the system 150c. The second proxy system 510b can then complete authentication of the client device 125. At event 9, the cache system 510b performs the requested function and completes the second transaction. In some implementations (9a), the second proxy system 510b responds directly to the client device 125, while in other implementations (9b), the second proxy system 510b provides a response to the request to the request distributor 505, which then provides the response to the client device 125.

Figure 7:
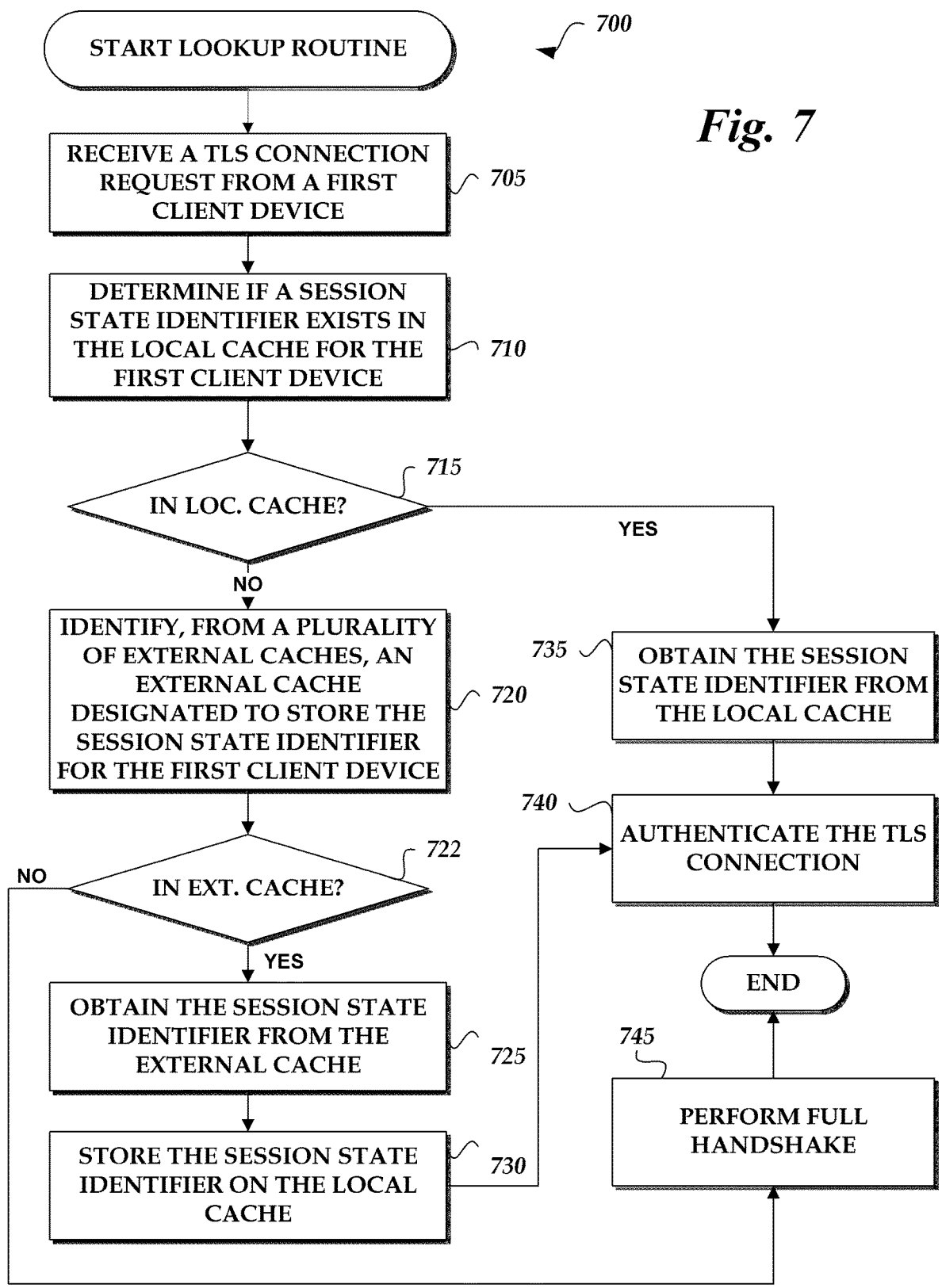
FIG. 7 schematically illustrates a logical flow diagram for a process to lookup data in the distributed services system of FIG. 5.

FIG. 7 schematically illustrates a logical flow diagram for a lookup routine 700 to lookup data items in the distributed services system 500 of FIG. 5. In some implementations, the routine is performed by components of the distributed caching system 500 described with reference to FIG. 5, such as a cache system 150 or proxy system 510. For ease of explanation, the following describes the routine as performed by a proxy system 510. The routine is discussed in the context of an example scenario that is intended to illustrate, but not to limit, various aspects of the distributed services system 500. In one example scenario, the routine 700 is performed by a proxy system 510 attempting to reuse existing negotiation data from a previous connection establishment transaction.

Beginning at block 705, the proxy system 510 receives a TLS connection request from a first client device. For example, the first request may come from a client device 125, with the request transmitted over the network 120a, received and routed by a request distributor 505, and sent to a networking interface or another interface (e.g., an application programming interface or application) of the proxy system 510. Assuming the client device 125 was previously authenticated, a session state identifier (e.g., a session ID or other identifier associated with session state data) may still be stored on the distributed caching system 100. The proxy system 510 can search for the cached session ID rather than performing a re-authentication. By doing so, the system 510 can improve performance and reduce latency.

At block 710, the proxy system 510 determines whether a session state identifier and/or session data is stored on the system's local cache 145. For example, the distributed caching system 500 can obtain or derive some type of key or identifier (e.g., user ID, URL, filename, etc.) from the first request. It can then determine whether the key and a value associated with the key are in the cache. For example, the cache can include a hash table or similar structure and the proxy system 510 checks if the hash table includes an entry for the key by applying a hashing function to the key.

At decision block 715, based on the determination, the proxy system 510 proceeds to block 720 or block 735. In some cases, the session state identifier is in the cache (e.g., a cache hit) and the system proceeds to block 735. In some cases, the session state identifier is not in the cache (e.g., a cache miss) and the system proceeds to block 720.

At block 720, the proxy system 510 identifies, from a plurality of external caches, an external cache (e.g., a cache system 150 of the distributed caching system 100) designated to store the first data item. In one embodiment, the cache system 510 applies a hashing function (e.g., consistent hashing) to the data item request or an identifier derived or generated from the data item request to identify the external cache. In one embodiment, the same data item request maps to the same external cache, thus, if the first data item has previously been requested, the external cache may still have the first data item cached.

At decision block 722, the proxy system 510 determines whether the session state identifier is stored on the external cache. In some cases, the session state identifier is in the external cache (e.g., a cache hit) and the system proceeds to block 725. In some cases, the session state identifier is not in the cache (e.g., a cache miss) and the system proceeds to block 745.

At block 725, the proxy system 510 obtains the session state identifier from the external cache. In some cases, the session state identifier is associated with additional session data and, in some embodiments, the proxy system 510 obtains the session data with the session state identifier from the external cache. In some cases, the session state identifier is sufficient to allow the proxy system 510 to authenticate the client device without additional session data.

At block 730, the proxy system 510 stores the session state identifier in the system's local cache. In some embodiments, the proxy system 510 stores additional session data on the local cache.

At block 740, the proxy system 510 authenticates the TLS connection. The proxy system 510 may then securely communicate with the client device 125 and can receive and fulfill requests from the client device. The routine 700 can then end.

Referring back to block 715, if the local cache includes the session state identifier, the routine 700 proceeds to block 735. At block 735, the proxy system 510 obtains the session state identifier from the local cache. The proxy system may also obtain additional session data associated with the session state identifier. The routine 700 can then proceed to block 740, perform the operations described above, and then end.

Referring back to block 722, if the external cache does not store the session state identifier, the routine 700 proceeds to block 745. At block 745, the proxy system 510 performs a full handshake or otherwise re-authenticates the client device. For example, the proxy system 510 can treat the request as a new request and go through the complete TLS connection setup process. The routine 700 can then end.

Multiple Breakpoints for Security Handshakes

Figure 8:
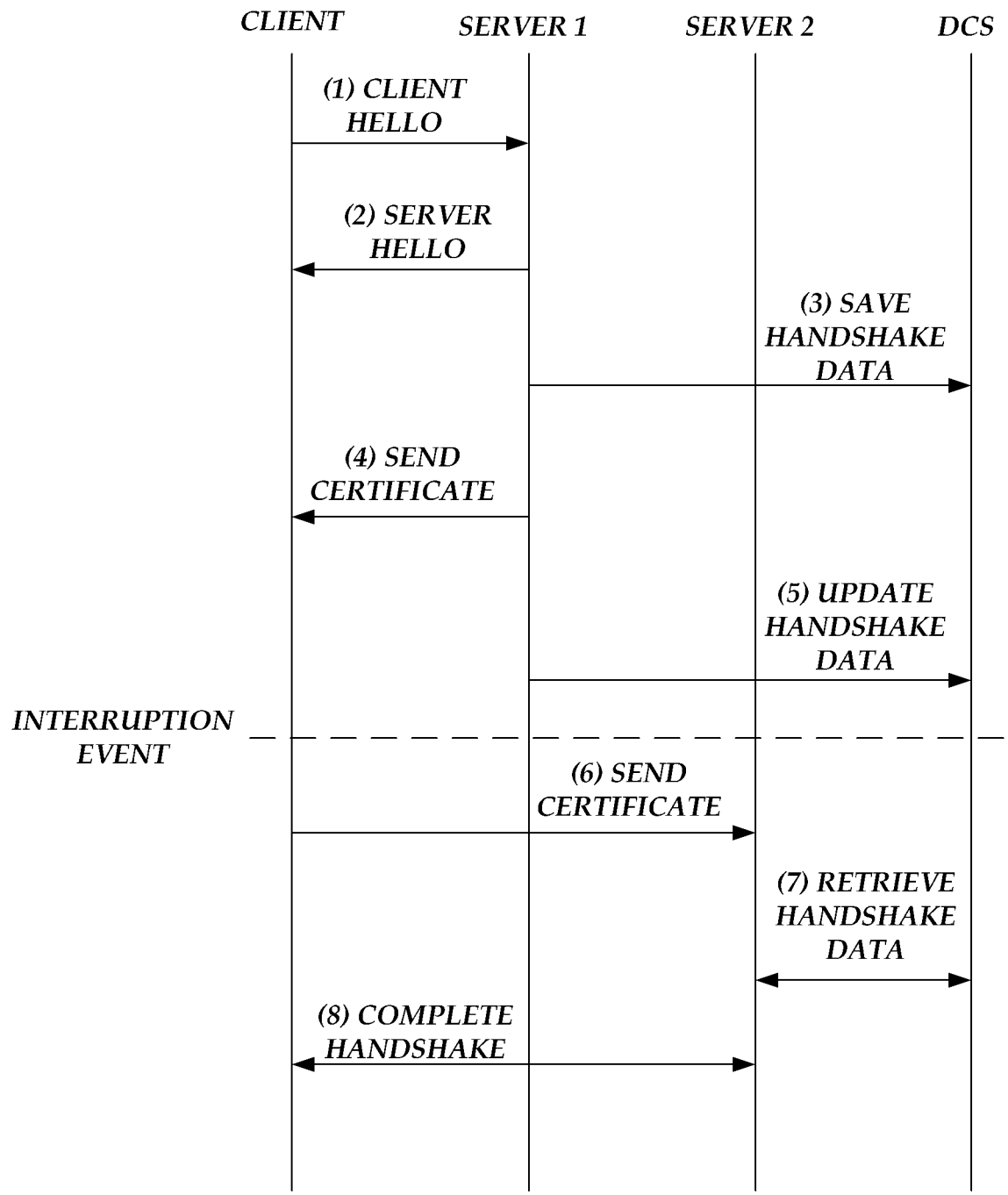
FIG. 8 schematically illustrates an embodiment of a data flow in a distributed caching system configured to enable resumption of security handshake transactions.

FIG. 8 schematically illustrates an embodiment of a data flow in a distributed caching system configured to enable resumption of security handshake transactions. In one embodiment negotiation data between a client device and a server during different points in the SSL/TLS handshake negotiation (or other secure transportation protocol) are stored on the distributed caching system 100. By saving the negotiation data, such as the TLS negotiation data described above, during different points, the distributed caching system 100 can enable additional breakpoints in secure transportation protocol handshake transactions where the negotiations can be resumed. For example, in the case of a packet time out, the negotiation can be resumed with the same server or even a different server when the client device attempts to reconnect.

This technique can be particularly beneficial in systems, such as the disturbed services system 500 of FIG. 5, where a server is dynamically selected from a group of servers to respond to requests from client devices. In such a system, a client reconnecting to the distributed services system 500 can be assigned to a different server than it was originally connected to before the initial handshake transaction was interrupted. However, by saving the negotiation data to the distributed caching system 100, a newly assigned second server can obtain the saved negotiation data and transparently resume the handshake operation, even if the secure transportation protocol does not support a resumption feature.

In event 1, the client sends a client hello message to server 1. In event 2, server 1 then responds to the client hello message with a server hello message. In event 3, server 1 also transmits the handshake data received/and or sent by server 1 to the distributed caching system 100.

In event 4, server 1 sends a certificate to the client. Such certificates can be used the calculation of encryption keys. At event 5, server 1 updates the handshake data saved in the distributed caching system 100. At this point, an interruption event occurs. For example, packets sent between the client and server 1 may have been dropped or lost, causing a time out. Other possible interruptions include crashes, restarts or other failure events.

In event 6, the client sends a certificate or otherwise responds to the previous message from server 1. For example, the client can send the next message required by the protocol or the client can resend the previous message if no response was received from server 1 due to the interruption event.

In the illustrated scenario, the client is assigned to server 2 subsequent to the interruption event. For example, server 1 may have crashed and is still not available to resume handling transactions. Server 2 retrieves the handshake data stored by server 1 from the distributed caching system. In event 6, the client and server 2 complete the handshake.

In another scenario (not shown), the client is again assigned to server 1 after the interruption event. However, in the scenario, server 1 lost any local copies of the handshake data after the interruption event. For example, server 1 may have crashed or rebooted, losing non-permanently stored data. In this scenario, server 1 can still retrieve the handshake data from the distributed caching system and complete the handshake transaction with the client.

Multiple Data Center Embodiments

Figure 9:
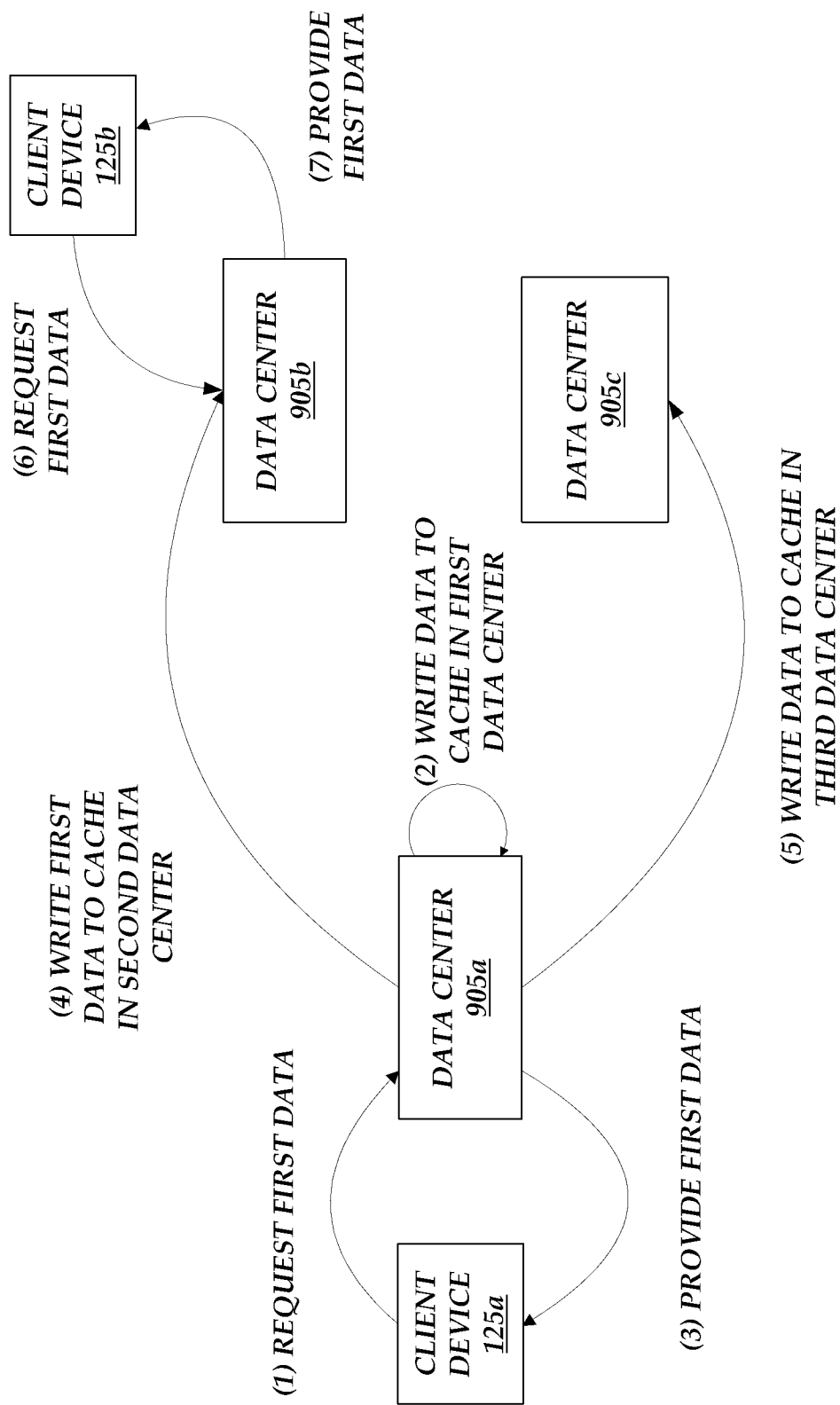
FIG. 9 illustrates an embodiment of a data flow in a distributed caching system having caching systems distributed across multiple data centers or other partition groups.

FIG. 9 illustrates an embodiment of a data flow in a distributed caching system having caching systems distributed across multiple data centers or other partition groups. In one embodiment, writes to a cache by a caching system at a first data center are also performed at one or more other caching systems at one or more other data centers. To the extent that data requested at one data center is also requested at other data centers, distributing the cache writes can increase the cache hits at the other data centers. While the following disclosure discusses an embodiment across multiple data centers, other partition groups can also be used. For example, a partition group can include geographic groupings, security groupings, network partitions, virtual machine instances operation on the same computer or multiple computers, one or more cache servers, application clusters and/or other defined groupings of computing resources.

One scenario where spreading cache writes can be beneficial is where a web site is hosted by a distributed services system 500 operating on multiple data centers. For example, the web site may be hosted on data centers on the U.S. east coast and on the U.S. west coast, in order to reduce latency and better serve visitors of the web site across the country. As the east coast and west coast are different geographic regions on different time zones, visitors on the east coast will likely begin visiting the web site earlier than visitors on the west coast. However, if cache updates caused by requests on the east coast data center (which is on an earlier time zone) are propagated to the west coast data center, then, when visitors begin requesting data items from caching systems on the west coast data center, the caching systems will already be pre-populated with useful data items, thereby increasing the chances of cache hits occurring in the caching systems in the west coast data centers.

In one embodiment, while cache writes are propagated across multiple data centers, cache reads remain local to a particular data center. Requesting data from a different data center can be expensive, as network packets may have to be transmitted over significant distances over multiple networks, increasing the chance that packets can be lost. By keeping reads local to the data center, high responsiveness to client requests can be maintained. Cache writes, meanwhile, can be performed separately from responding to client requests, thus propagating cache writes does not necessarily affect responsiveness to client requests.

Starting at event 1, a first client device 125a requests a first data from a first cache system in a first data center 905a. The first cache system can then check caches (e.g., local caches or external caches) associated with the first cache system in the first data center. Assuming the first data item is not in the caches or if the first data item is not up to date, the first cache system can retrieve the first data item from primary storage.

At event 2, the first cache system can then update the one or more caches (e.g., the local cache) in the first data center 905a with the first data item. For example, the first cache system can load the first data item into the one or more caches or it can update a stale entry for the first data item in the one or more caches.

At event 3, the first cache system can then provide the first data item to the client device 125a in response to the original request. At event 3 and event 4, the first cache system can transmit the cache update for the first data item to a second data center 905b and a third data center 905c, respectively, in order to cause caches at those data centers to be updated. As discussed above, the cache writes can be performed separately from responding to client requests, thus, in some embodiments, event 3 and/or 4 are performed before event 2 and vice versa. Referring back to event 4, a second cache system at the second data center 905b receives the cache update and updates one or more caches associated with the second cache system. Likewise, referring back to event 5, a third cache system at the third data center 905c receives the cache update and updates one or more caches associated with the third cache system.

At event 6, the second cache system receives a second request for the first data item from a second client device 125b. As cache(s) in the data center 905b have been updated as a result of the cache update propagation, the second cache system can find the first data item in the cache(s) at the second data center 905b. At event 7, the second cache system provides the first data item retrieved from the cache(s) to the second client device 125b.

Additional Embodiments

While the above disclosure has discussed specific embodiments of the distributed caching system, many variations of the distributed caching system 100 are possible. For example, different data structures can be used instead of or in addition to the data structures described above. For example, rather than a hash table, the in-memory cache may use a b-tree, b+ tree, binary search tree, skip list or other data structure. In another example, data stored in the distributed caching system 100 may be encrypted or unencrypted.

As described above, the distributed caching system 100 can be implemented with one or more physical servers or other computing machines, such as several computing machines interconnected via a network. Thus, each of the components depicted in the distributed caching system 100 can include hardware and/or software for performing various features. In one embodiment, the distributed caching system 100 is implemented on a computing system that hosts a web site or collection of web sites that the system 100 monitors.

The distributed caching system 100 can include one or more servers for receiving and responding to requests from a network, such as requests to process session records. The one or more servers can include web servers, application servers, database servers, combinations of the same, or the like.

The processing of the various components of the distributed caching system 100 can be distributed across multiple machines, networks and other computing resources. The various components of the distributed caching system 100 can also be implemented in one or more virtual machines, rather than in dedicated servers. Likewise, data repositories can include represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the distributed caching system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of interactions (additionally or alternatively) between the distributed caching system 100 and the users and/or user systems are possible in addition to those described above. For example, a distributed caching system 100 interaction can be received directly from a user or administrator (e.g., via an interactive console, web browser or other GUI provided by the distributed caching system 100) or from an executing program. In some embodiments, users may interact with the distributed caching system 100 using other types of interfaces and in other ways.

In some embodiments, the distributed caching system 100 and its components are executed or embodied by one or more physical or virtual computing systems. For example, in some embodiments, a server computing system that has components including a central processing unit (CPU), input/output (I/O) components, storage and memory may be used to execute some or all of the components of the distributed caching system 100. The I/O components can include a display, a network connection to the network 105, a computer-readable media drive and other I/O devices (e.g., a keyboard, a mouse, speakers, etc.). In some embodiments, the distributed caching system 100 may be configured differently than described above.

An embodiment of the distributed caching system 100 can be stored as one or more executable program modules in the memory of the server and/or on other types of non-transitory computer-readable storage media, and the distributed caching system 100 can interact with computing assets over the network 105. In one embodiment, the distributed caching system 100 may have additional components or fewer components than described above. For example, the distributed caching system 100 may be built on top of existing software development or testing systems and designed to coordinate the actions of the existing systems.

First Set of Example Embodiments

In an example embodiment, a system for distributed data caching comprises: (1) an inter-process communication interface for receiving requests, the requests including a first request for a first data item from a first client; (2) computer memory for storing a local cache; and one or more processors configured to: determine whether the first data item is stored in the local cache; in response to determining that the first data item is not on the local cache, determine a first external cache from a plurality of external caches, the first external cache designated to store the first data item; transmit the first request for the first data item to the external cache, the first request sent with a second request for a second data item, the second request determined to be designated for the external cache, the first request and the second request transmitted over a single negotiated streaming protocol connection socket; receive the first data item from the first external cache; and provide the first data item to the first client.

In another example, the above system, wherein the one or more processors are configured to detect inactive connections and close the inactive connections.

In an additional example, the above system, wherein the single negotiated streaming protocol connection socket is a transmission control protocol (TCP) socket or an inter-process communication (IPC) socket.

In another example, the above system, wherein the one or more processors are configured to: associate multiple threads that handle requests from clients to a plurality of network connections to the clients; and dynamically assign a request received on one of the plurality of network connections to one of the associated multiple threads.

In an additional example, the above system, further comprising a distributed caching client configured to: obtain the first data item from the external cache; and transmit the first data item directly on a network connection to the first client without waking a thread assigned to the first client.

In another example, the above system, wherein the one or more processors are configured to determine a first external cache from a plurality of external caches by obtaining an identifier based at least partly on the first request and applying a deterministic algorithm to the identifier such that the deterministic algorithm identifies the first external cache.

In an additional example, the above system, wherein the first data item is received prior to the second data item.

In another example, the above system, wherein the first data item is received after the second data item.

In an example embodiment, a method of caching data comprising: receiving, on a first caching system, a first request for a first data item from a requestor; identifying a first external cache designated to store the first data item from a plurality of external caches; transmit the first request for the first data item with a second request for a second data item, the second request determined to be designated for the external cache, the first request and the second request aggregated over a single protocol connection to the external cache; receiving the first data item from the first external cache; and providing the first data item to the requestor.

In another example, the above method, wherein the single protocol connection comprises a single negotiated streaming protocol connection. Further, in one example, the above method wherein the negotiated streaming protocol connection is a Transmission Control Protocol (TCP) connection. Additionally, in another example, the above method, wherein the negotiated streaming protocol connection uses a UNIX domain socket.

In an additional example, the above method, further comprising detecting inactive connections to one or more external caches and attempting to connect to one or more external caches using a background thread of execution.

In another example, the above method, further comprising: associating multiple threads that handle requests from requestors to a plurality of network connections to the requestors; and dynamically assigning a request received on one of the plurality of network connections to one of the associated multiple threads.

In an additional example, the above method, wherein identifying the first external cache from a plurality of external caches comprises: obtaining an identifier based at least partly on the first request; and applying a deterministic function to the identifier, wherein the deterministic function identifies the first external cache.

In another example, the above method, wherein the requestor is a service module configured to handle requests received from a plurality of client devices.

In an additional example, the above method, wherein the requestor is a first client device.

In another example, the above method, wherein the requestor is a thread.

In an additional example, the above method, wherein the local cache stores data using fixed size storage blocks.

In another example, the above method, wherein the local cache stores data using a slab allocation technique or a best fit allocation technique.

In an additional example, the above method, wherein identifying the first external cache designated to store the first data item from a plurality of external caches further comprises: determining whether the first data item is stored in a local cache of the first caching system; and in response to determining that the first data item is not on the local cache, identifying the first external cache from the plurality of external caches. Further, in one example, the above method, further comprising storing the first data item on the local cache.

In an example embodiment, non-transitory computer storage having stored thereon instructions that, when executed by a computer system, cause the computer system to perform operations comprising: identifying a first external cache designated to store a first data item from a plurality of external caches, the first data item requested in a first request; identifying a second request for a second data item destined for the first external cache, the first external cache designated to store the second data item; transmitting the first request and the second request together over a single connection socket to the external cache; and receiving the first data item or the second data item from the first external cache.

In another example, the above non-transitory computer storage, wherein the first request and the second request are multiplexed over a single transmission control protocol (TCP) socket or an inter-process communication (IPC) socket.

In an additional example, the above non-transitory computer storage, wherein the first request and the second request are multiplexed over a first connection protocol for local communications in the computer system and a second connection protocol for network communications.

In another example, the above non-transitory computer storage, wherein the first request is received from a first client device from a plurality of computing devices. Further, in one example, the above non-transitory computer storage, wherein the instructions further cause the computer system to perform operations comprising: detecting inactive connections to one or more external caches; and attempting to connect to the one or more external caches using a background thread of execution. In addition, in one example, the above non-transitory computer storage, wherein the instructions further cause the computer system to perform operations comprising: associating multiple threads that handle requests from the client devices to a plurality of network connections to the client devices; and assigning a request received on one of the plurality of network connections to one of the associated multiple threads.

In an additional example, the above non-transitory computer storage, wherein identifying the first external cache comprises: obtaining an identifier based at least partly on the first request; and applying a deterministic function to the identifier, wherein the deterministic function identifies the first external cache.

In another example, the above non-transitory computer storage, wherein either the first data item or the second data item is received by the computing system first.

Second Set of Example Embodiments

In an example embodiment, a distributed system for reusing secure sessions using non-locally cached data comprises: (1) a plurality of proxy systems configured to provide services to users, each proxy system having a local cache for storing data; (2) a request distribution module configured to: receive requests for secure communications over a network, the requests sent by a plurality of client devices associated with the users, the requests including a first request from a first client device; and assign the first request for secure communications to a first proxy system from the plurality of proxy systems; and (3) the first proxy system comprising a local cache, the first proxy system configured to: determine whether the local cache includes a session state identifier associated with the first request; in response to determining that the local cache does not include the session state identifier, identify a first cache system from a plurality of shared cache systems, the first cache system designated to store data items associated with the first request; determine whether the first cache system includes the session state identifier associated with the first request; in response to determining that the second computing device includes the session state identifier, obtain the session state identifier from the first cache system, wherein the session state identifier was stored on the first cache system as a result of a prior transaction with the first client device; and establish a secure connection with the first client device based at least in part on the session state identifier.

In another example, the above distributed system, wherein the secure connection uses Transport Layer Security (TLS) protocol.

In an additional example, the above distributed system, wherein the session state identifier was stored on the first cache system as a result of the prior transaction with the first client device, the prior transaction occurring between the first client device and a second proxy system different from the first proxy system.

In another example, the above distributed system, wherein the session state identifier was stored on the first cache system as a result of the prior transaction with the first client device, the prior transaction occurring between the first client device and the first proxy system.

In an additional example, the above distributed system, wherein the first computing device is configured to establish a secure connection with the first client device based at least in part on the session state identifier by obtaining cryptographic parameters associated with the session state identifier and performing an abbreviated hand shake operation using at least the cryptographic parameters.

In another example, the above distributed system, wherein session state identifier comprises a session ID.

In an example embodiment, a method comprises: receiving, on a first computing system, a request for secure communications, the request sent by a first client device, wherein a previous request from the first client device was sent during a first session; identifying a second computing system having a cache, the second computing system designated to store data associated with the request in the cache, the second computing system accessible to the first computing system over a network; obtaining a session state identifier from the second computing system; and establishing, from the first computing system, a secure connection with the first client device based at least in part on the session state identifier.

In an additional example, the above method, wherein obtaining the session state identifier from the second computing system comprises: determining whether the cache of the second computing system includes the session state identifier associated with the request, the session state identifier generated during the first session; and in response to determining that the cache of the second computing system includes the session state identifier, obtaining the session state identifier from the second computing system.

In another example, the above method, wherein the secure connection uses Transport Layer Security (TLS) protocol.

In an additional example, the above method, wherein establishing the secure connection with the first client device comprises resuming the first session.

In another example, the above method, wherein establishing the secure connection with the first client device based at least in part on the session state identifier comprises obtaining session state data associated with the session state identifier and performing an abbreviated hand shake operation using at least the session state data.

In an additional example, the above method, further comprising determining that the session state identifier is not stored on a local cache of the first computing system.

In another example, the above method, wherein the first session was between the first client device and a third computing system different from the first computing system and the second computing system, the third computing system configured to transmit the session state identifier to the second computing system for storage on the cache of the second computing system.

In an additional example, the above method, wherein the first session was between the first client device and the first computing system, the first computing system configured to store the session state identifier generated during the first session on the cache of the second computing system.

In another example, the above method, wherein the session state identifier comprises a session ID.

In an additional example, the above method, wherein identifying the second computing system designated to store data associated with the request comprises applying a consistent hashing function to an identifier related to the request. Further, in the above method, the identifier includes an IP address.

In an additional example, the above method, wherein the second computing system is part of a shared caching system.

In another example, the above method, wherein the session state identifier is reused from a prior secure connection.

In an additional example, the above method, wherein the secure connection is resumed from a prior network transaction.

In an example embodiment, a non-transitory computer storage having stored thereon instructions that, when executed by a computer system, cause the computer system to perform operations comprising: receiving, on a first computing system, a request for secure communications, the request sent by a first client device, wherein a previous request from the first client device was sent during a first session; determining whether an external cache includes a session state identifier associated with the request, the session state identifier generated during the first session; in response to determining that the external cache includes the session state identifier, obtaining the session state identifier from the external cache; and establishing, from the first computing system, a secure connection with the first client device based at least in part on the session state identifier.

In another example, the above non-transitory computer storage, wherein establishing a secure connection with the first client device based at least in part on the session state identifier comprises reusing negotiation data from the first session.

In an additional example, the above non-transitory computer storage, wherein the first session was between the first client device and a second computing system different from the first computing system, the second computing system configured to store the session state identifier in the external cache.

In another example, the above non-transitory computer storage, wherein the external cache is a first external cache of a shared cache system comprising a plurality of external caches.

In an additional example, the above non-transitory computer storage, further comprising identifying the first external cache designated to store the session state identifier from the plurality of external caches of the shared cache system.

In an example embodiment, a distributed system comprises: a first proxy system comprising one or processors and a local cache, the first proxy system configured to: in response to determining that the local cache does not include a session state identifier associated with a request for a secure connection from a client device, identify a first cache system from the plurality of shared cache systems, the first cache system designated to store data items associated with the first request; in response to determining that the first cache system includes the session state identifier, obtain the session state identifier from the first cache system, wherein the session state identifier was stored on the first cache system as a result of a prior transaction with the client device; and establish a secure connection with the client device based at least in part on the session state identifier.

Third Set of Example Embodiments

In an example embodiment, a system for distributed data caching comprises: (1) a first caching system in a first partition group, the first caching system configured to: in response to receiving a first cache update for a first data item, update a first cache in the first partition group with the first cache update; and transmit the first cache update for the first data item to a second caching system in a second partition group; and (2) the second caching system in the second partition group, the second caching system configured to: in response to receiving the first cache update transmitted by the first caching system, update a second cache in the second partition group with the first cache update for the first data item; in response to receiving a request for the first data item from a requestor, obtain the first data item from the second cache; and provide the first data item to the requestor.

In another example, the above system, wherein the first partition group and the second partition group are located in different time zones.

In an additional example, the above system, wherein the first partition group and the second partition group are located in different geographic areas.

In another example, the above system, wherein the first cache system and the second cache system are part of a distributed caching system that spans multiple partition groups.

In an example embodiment, a method of caching data in a disturbed system, the method comprising: receiving, at a first caching system at a first partition group, an update for a first data item; updating a first cache associated with the first caching system with the update for the first data item, the first cache in the first partition group; and transmitting the cache update for the first data item to a second caching system in a second partition group, thereby causing the second caching system to update a second cache on the second partition group with the cache update for the first data item.

In another example, the above method, further comprising: in response to receiving a request for the first data item at the first caching system, retrieving the first data item from the first cache in the first partition group.

In an additional example, the above method, further comprising: in response to receiving a request for the first data item at the second caching system, retrieving the first data item from the second cache in the second partition group.

In another example, the above method, wherein the first partition group and the second partition group are located in different time zones.

In an additional example, the above method, wherein the first partition group and the second partition group are located in different geographic areas.

In another example, the above method, wherein the first cache system and the second cache system are part of a distributed caching system that spans multiple partition groups.

In an additional example, the above method, wherein receiving the update for the first data item comprises: receiving a request for the first data item; and in response to determining that the first caching system does not store the first data item, retrieving the first data item from primary storage; wherein the first cache update for the first data item comprises adding the first data item.

In another example, the above method, wherein updating the first cache associated with the first caching system comprises loading the first data item into the first cache.

In an additional example, the above method, wherein updating the first cache associated with the first caching system comprises: finding an entry in the first cache associated with the first data item; and updating the entry in the first cache.

In another example, the above method, wherein the first partition group is a data center and the second partition group is a data center.

In an additional example, the above method, wherein the first partition group comprises multiple virtual machine instances on the same computer.

In an example embodiment, non-transitory computer storage having stored thereon instructions that, when executed by a computer system, cause the computer system to perform operations comprising: receiving, at a first caching system at a first partition group, an update for a first data item; updating a first cache associated with the first caching system with the update for the first data item, the first cache in the first partition group; and causing one or more additional caching systems located in one or more additional partition groups to update caches located at the one or more additional partition groups.

In another example, the above non-transitory computer storage wherein the first partition group and the one or more additional partition groups are located in different time zones.

In an additional example, the above non-transitory computer storage, wherein the first partition group and the one or more additional partition groups are located in different geographic areas.

In another example, the above non-transitory computer storage, wherein the first cache system and the one or more additional cache systems are part of a distributed caching system that spans multiple partition groups.

In an additional example, the above non-transitory computer storage, wherein updating the first cache associated with the first caching system comprises loading the first data item into the first cache.

In another example, the above non-transitory computer storage, wherein updating the first cache associated with the first caching system comprises: finding an entry in the first cache associated with the first data item; and updating the entry in the first cache.

In an additional example, the above non-transitory computer storage, wherein the first partition group comprises a data center and the second partition group comprises a data center.

In another example, the above non-transitory computer storage, wherein the first partition group comprises multiple virtual machine instances on the same computer.

Fourth Set of Example Embodiments

In an example embodiment, a system for distributed data caching comprises: (1) an inter-process communication interface for receiving requests, the requests including a first request for a first data item from a first requestor; (2) computer memory for storing a local cache; and (3) one or more processors configured to: determine whether the first data item is stored in the local cache; in response to determining that the first data item is not on the local cache, determine a first external cache from a plurality of external caches, the first external cache designated to store the first data item; transmit the first request for the first data item to the external cache; receive the first data item from the first external cache; determine whether a second requestor has requested the first data item; in response to determining that a second requestor has requested the first data item, provide the first data item to the first requestor and the second requestor; and in response to determining that a second requestor has not requested the first data item, provide the first data item to the first requestor.

In another example, the above system, wherein the first requestor is a first client device and the second requestor is a second client device.

In an additional example, the above system, wherein the first requestor is a first thread and the second requestor is a second thread.

In another example, the above system, further comprising a distributed caching client configured to: obtain the first data item from the external cache; and transmit the first data item directly on a network connection to the first client without waking a thread assigned to the first client.

In an additional example, the above system, wherein the one or more processors are configured to determine a first external cache from a plurality of external caches by obtaining an identifier based at least partly on the first request and applying a deterministic algorithm to the identifier such that the deterministic algorithm identifies the first external cache.

In another example, the above system, wherein the one or more processors are further configured to: identify additional requestors of the first data item; and in response to receiving the first data item, providing the first data item to the additional requestors.

In an example embodiment, a method of caching data, the method comprising: receiving, on a first caching system, a first request for a first data item from a first requestor; identifying a first cache designated to store the first data item, the first cache selected from a local cache and a plurality of external caches; obtain the first data item from the first cache; and in response to determining that a second requestor has requested the first data item, provide the first data item to the first requestor and the second requestor.

In another example, the above method, further comprising: identifying additional requestors of the first data item; and in response to receiving the first data item, providing the first data item to the additional requestors.

In another example, the above method, wherein the first cache is the local cache.

In an additional example, the above method, wherein the first cache is one of the plurality of external caches.

In another example, the above method, wherein identifying the first cache from the local cache and the plurality of external caches comprises: determining whether the first data item is stored in the local cache; and in response to determining that the first data item is not on the local cache, determining a first external cache from the plurality of external caches, the first external cache designated to store the first data item; wherein the first cache is the first external cache. Further, in one example, the above method, wherein determining the first external cache from the plurality of external caches comprises: obtaining an identifier based at least partly on a key associated with the first request; and applying a deterministic function to the identifier, wherein the deterministic function identifies the first external cache. Additionally, in one example, the above method, wherein the first request and additional requests identical to the first request are associated with a same key. Further, in one example, the above method, wherein the deterministic function is a consistent hashing function.

In an additional example, the above method, wherein the first requestor is a first client device and the second requestor is a second client device.

In another example, the above method, wherein the first requestor is a first thread and the second requestor is a second thread.

In an example embodiment, non-transitory computer storage having stored thereon instructions that, when executed by a computer system, cause the computer system to perform operations comprising: receiving a first request for a first data item from a first requestor; obtaining the first data item from a first cache; and in response to determining that a second requestor has requested the first data item, provide the first data item to the first requestor and the second requestor.

In another example, the above non-transitory computer storage, wherein obtaining the first data item from the first cache comprises selecting the first cache from a local cache and a plurality of external caches.

In another example, the above non-transitory computer storage, wherein selecting the first cache from the local cache and the plurality of external caches comprises: determining whether the first data item is stored in the local cache; and in response to determining that the first data item is not on the local cache, determining a first external cache from the plurality of external caches, the first external cache designated to store the first data item; wherein the first external cache is the first cache. Further, in one example, the above non-transitory computer storage, wherein determining the first external cache from the plurality of external caches comprises: obtaining an identifier based at least partly on a key associated with the first request; and applying a deterministic function to the identifier, wherein the deterministic function identifies the first external cache.

In another example, the above non-transitory computer storage, further comprising: identifying additional requestors of the first data item; and in response to receiving the first data item, providing the first data item to the additional requestors.

Fifth Set of Example Embodiments

In an example embodiment, a distributed system for resuming security handshakes using non-locally cached data, the system comprising: (1) a plurality of server systems configured to provide services to users, each server system configured to store security handshake data on a distributed caching system; (2) the distributed caching system comprising one or more caching systems, the distributed caching system configured to: receive handshake data for a first handshake transaction between a first client and a first server from the plurality of server systems; store the handshake data in the one or more caching systems; in response to an interruption event that interrupts the first handshake transaction and causes the first client to be assigned to a second server from the plurality of server systems, receive a request for the handshake data from the second server; and provide the second server with the handshake data to enable the first handshake transaction to be resumed.

In another example, the above system, wherein the security handshake is for Transport Layer Security (TLS) protocol.

In an additional example, the above system, wherein the security handshake is for Secure Sockets Layer (SSL) protocol.

In another example, the above system, wherein the handshake data includes cryptographic parameters.

In an additional example, the above system, wherein the handshake data includes data sent in an initial message from the first client and data sent in an initial message from the first server.

In an example embodiment, a method for resuming security handshakes using non-locally cached data, the method comprising: receiving handshake data for a first handshake transaction between a first client and a first server from a plurality of server systems; storing the handshake data in one or more caching systems; in response to an interruption event that interrupts the first handshake transaction and causes the first client to be assigned to a second server from the plurality of server systems, receiving a request for the handshake data from the second server; and providing the second server with the handshake data to enable the first handshake transaction to be resumed.

In another example, the above method, wherein the security handshake is for Transport Layer Security (TLS) protocol.

In an additional example, the above method, wherein the security handshake is for Secure Sockets Layer (SSL) protocol.

In another example, the above method, wherein the handshake data includes cryptographic parameters.

In an additional example, the above method, wherein the handshake data includes data sent in an initial message from the first client and data sent in an initial message from the first server.

In another example, the above method, wherein the handshake data includes one or more of a public key, an encryption key, cryptographic material and a security certificate.

In an example embodiment, non-transitory computer storage having stored thereon instructions that, when executed by a computer system, cause the computer system to perform operations comprising: receiving handshake data for a first handshake transaction between a first client and a first server from a plurality of server systems; storing the handshake data on a caching system accessible from each of the plurality of server systems; receiving a request for the handshake data from a second server of the plurality of the server systems; and providing the second server with the handshake data to enable the first handshake transaction to be resumed by the second server; wherein the first handshake transaction between the first client and the first server was interrupted.

In another example, the above non-transitory computer storage, wherein the security handshake is for Transport Layer Security (TLS) protocol.

In an additional example, the above non-transitory computer storage, wherein the security handshake is for Secure Sockets Layer (SSL) protocol.

In another example, the above non-transitory computer storage, wherein the handshake data includes cryptographic parameters.

In an additional example, the above non-transitory computer storage, wherein the handshake data includes data sent in an initial message from the first client and data sent in an initial message from the first server.

In another example, the above non-transitory computer storage, wherein the handshake data includes one or more of a public key, an encryption key, cryptographic material and a security certificate.

In an example embodiment, a method comprising: receiving handshake data for a first handshake transaction between a first client and a first server; storing the handshake data in a caching system; in response to an interruption event that interrupts the first handshake transaction and causes the first server to lose locally stored handshake data, receiving a request for the handshake data from the first server; and providing the first server with the handshake data to enable the first handshake transaction to be resumed.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for distributed data caching, the system comprising:
   a first caching system in a first partition group, the first caching system configured to:
   receive a first request to retrieve a data item;
   in response to the first request to retrieve the data item and determining that the first caching system does not store the data item:
   retrieve the data item from a primary storage, the primary storage separate from the first caching system;
   update a first cache in the first partition group by adding the data item; and
   transmit the data item that was determined to not be stored in the first caching system to a second caching system in a second partition group; and
   the second caching system in the second partition group, the second caching system configured to:
   in response to receiving the data item transmitted by the first caching system, update a second cache in the second partition group by adding the data item;
   in response to receiving a second request to retrieve the data item from a requestor, obtain the data item from the second cache; and
   provide the data item to the requestor.

2. The system of claim 1, wherein the first partition group and the second partition group are located in different time zones.

3. The system of claim 1, wherein the first partition group and the second partition group are located in different geographic areas.

4. The system of claim 1, wherein the first cache system and the second cache system are part of a distributed caching system that spans multiple partition groups.

5. A method of caching data in a distributed system, the method comprising:
   receiving a first request to retrieve a data item at a first caching system at a first partition group;
   in response to the first request to retrieve the data item and determining that the first caching system does not store the data item:
   retrieving the data item from a primary storage, the primary storage separate from the first caching system;
   updating a first cache associated with the first caching system by adding the data item, the first cache in the first partition group; and
   transmitting the data item that was determined to not be stored in the first caching system to a second caching system in a second partition group, thereby causing the second caching system to update a second cache on the second partition group by adding the data item and to provide the data item in response to a second request to retrieve the data item.

6. The method of claim 5, further comprising retrieving the data item from the first cache in the first partition group.

7. The method of claim 5, further comprising causing the second caching system to, in response to receiving the second request to retrieve the data item, retrieving the data item from the second cache in the second partition group.

8. The method of claim 5, wherein the first partition group and the second partition group are located in different time zones.

9. The method of claim 5, wherein the first partition group and the second partition group are located in different geographic areas.

10. The method of claim 5, wherein the first cache system and the second cache system are part of a distributed caching system that spans multiple partition groups.

11. The method of claim 5, wherein updating the first cache associated with the first caching system comprises loading the data item into the first cache.

12. The method of claim 5, wherein updating the first cache associated with the first caching system comprises:
    finding an entry in the first cache associated with the data item; and
    updating the entry in the first cache.

13. The method of claim 5, wherein the first partition group is a data center and the second partition group is a data center.

14. The method of claim 5, wherein the first partition group comprises multiple virtual machine instances on a same computer.

15. Non-transitory computer storage having stored thereon instructions that, when executed by a computer system, cause the computer system to perform operations comprising:
    receiving a first request to retrieve a data item at a first caching system at a first partition group;
    in response to the first request to retrieve the data item and determining that the first caching system does not store the data item:
    retrieving the data item from a primary storage, the primary storage separate from the first caching system;
    updating a first cache associated with the first caching system by adding the data item, the first cache in the first partition group; and
    causing one or more additional caching systems located in one or more additional partition groups to update caches located at the one or more additional partition groups by adding the data item that was determined to not be stored in the first caching system and to provide the data item in response to one or more second requests to retrieve the data item.

16. The non-transitory computer storage of claim 15, wherein the first partition group and the one or more additional partition groups are located in different time zones.

17. The non-transitory computer storage of claim 15, wherein the first partition group and the one or more additional partition groups are located in different geographic areas.

18. The non-transitory computer storage of claim 15, wherein the first cache system and the one or more additional cache systems are part of a distributed caching system that spans multiple partition groups.

19. The non-transitory computer storage of claim 15, wherein updating the first cache associated with the first caching system comprises loading the data item into the first cache.

20. The non-transitory computer storage of claim 15, wherein updating the first cache associated with the first caching system comprises:
    finding an entry in the first cache associated with the data item; and
    updating the entry in the first cache.

21. The non-transitory computer storage of claim 15, wherein the first partition group comprises a data center and the second partition group comprises a data center.

22. The non-transitory computer storage of claim 15, wherein the first partition group comprises multiple virtual machine instances on a same computer.

* * * * *